United States Patent [19]
Baer et al.

[11] Patent Number: 5,701,068
[45] Date of Patent: Dec. 23, 1997

[54] BATTERY MANAGEMENT SYSTEM

[75] Inventors: Jose T. Baer, Sacramento, Calif.; Bill C. Davis, Round Rock; Richard J. Blanyer, Smithville, both of Tex.

[73] Assignee: Electrosource, Inc., San Marcos, Tex.

[21] Appl. No.: 761,002

[22] Filed: Dec. 5, 1996

Related U.S. Application Data

[63] Continuation of Ser. No. 412,197, Apr. 3, 1995, abandoned.
[51] Int. Cl.$^6$ .................. H02J 7/00; H01M 10/44
[52] U.S. Cl. .................. 320/15; 320/16; 320/17; 320/35
[58] Field of Search .................. 320/7, 15, 17, 320/18, 19, 35

[56] References Cited

U.S. PATENT DOCUMENTS

| | | | |
|---|---|---|---|
| 4,024,523 | 5/1977 | Arnold et al. | 340/249 |
| 4,052,717 | 10/1977 | Arnold et al. | 340/249 |
| 4,079,303 | 3/1978 | Cox . | |
| 4,217,536 | 8/1980 | Izumi | 320/48 |
| 4,238,721 | 12/1980 | DeLuca et al. | 320/18 |
| 4,249,242 | 2/1981 | Fleurier | 364/442 |

(List continued on next page.)

FOREIGN PATENT DOCUMENTS

| | | |
|---|---|---|
| A29 17 114 | 11/1980 | Germany . |
| 37 40 331 A1 | 6/1989 | Germany . |
| 4132229A1 | 4/1993 | Germany . |
| 42 16 045 A1 | 11/1993 | Germany . |
| WOA95 00978 | 1/1995 | WIPO . |

OTHER PUBLICATIONS

"A Microcomputer–Based Battery management System", by Zbigniew Noworolski and Eric Praetzel, International Telecommunications Energy Conference, Nov. 5–8, 1991, Proceedings Published by IEEE, 1992, pp. 177–180.

"Monitoring battery performance in Remote–Area Power–Supply (RAPS) systems", by M. wade, A. Chew, and R. Geraghty, The Workshop on Development and Management of Battery Systems, Oct. 25–26, 1990, Published by Journal of Power Sources, vol. 35, No. 4, Sep. 1991, pp. 421–430.

"Modular battery charging system", Advertisement published by Mirabor Designs 1994.

(List continued on next page.)

*Primary Examiner*—Peter S. Wong
*Assistant Examiner*—Patrick B. Law
*Attorney, Agent, or Firm*—Arnold White & Durkee

[57] ABSTRACT

A battery management system for management and control of a plurality of rechargeable batteries connected in series. A programmed central processing unit communicates with a plurality of battery modules and a bulk charger. Each of the battery modules includes a rechargeable battery, a sensor node including a plurality of battery sensors and a microcontroller that processes signals generated by the battery sensors, and a direct current charger. During a charging cycle the bulk charger provides a variable bulk charging current to the rechargeable batteries connected in series and each of the rechargeable batteries receive a charging current from individual direct current chargers positioned at each rechargeable battery. During the charging cycle, the voltage and temperature of the rechargeable batteries are monitored by the programmed central processing unit by means of the sensor nodes and the bulk charging current reduced by one half when any battery voltage reaches a predetermined clamping voltage. Once the bulk charging current is reduced to approximately 1 to 2 percent of the 3-hour discharge capacity for the rechargeable batteries, the bulk charger is turned off and the direct current chargers finish each battery charge independently.

48 Claims, 12 Drawing Sheets

U.S. PATENT DOCUMENTS

| | | | |
|---|---|---|---|
| 4,278,970 | 7/1981 | Streczyn et al. | 340/599 |
| 4,322,766 | 3/1982 | Becker et al. | 361/17 |
| 4,553,081 | 11/1985 | Koenck . | |
| 4,571,533 | 2/1986 | Dey | 320/25 |
| 4,670,703 | 6/1987 | Williams . | |
| 4,709,202 | 11/1987 | Koenck et al. | 320/43 |
| 4,885,523 | 12/1989 | Koenck . | |
| 5,103,156 | 4/1992 | Jones et al. | 320/35 |
| 5,159,272 | 10/1992 | Rao et al. | 324/429 |
| 5,179,335 | 1/1993 | Nor | 320/21 |
| 5,187,425 | 2/1993 | Tanikawa | 320/31 |
| 5,202,617 | 4/1993 | Nor | 320/2 |
| 5,204,611 | 4/1993 | Nor et al. | 320/21 |
| 5,229,704 | 7/1993 | Knepper . | |
| 5,250,904 | 10/1993 | Salander et al. . | |
| 5,280,320 | 1/1994 | Mahoney | 320/14 |
| 5,280,827 | 1/1994 | Taylor et al. | 180/165 |
| 5,302,902 | 4/1994 | Groehl | 324/434 |
| 5,305,629 | 4/1994 | Campbell et al. | 73/1 D |
| 5,349,535 | 9/1994 | Gupta | 364/483 |
| 5,422,558 | 6/1995 | Stewart | 320/7 |
| 5,438,250 | 8/1995 | Retzlaff | 320/17 |
| 5,469,042 | 11/1995 | Rühling | 320/17 |

OTHER PUBLICATIONS

"Charge Equalizing System For Life Stabilizing of Long String Valve Requlated EV–Batteries", by Hans Tuphorn, Published in the Budingen Quarterly Report, Sep. 26, 1994.

"SmartGuard—Long–Life Battery Using Intelligent Modular Control System" by John Dunning, Ilker Bayraktar, and Benjamin Eiref, Sales Brochure published by Delco Remy and AeroVironment, Jun. 3, 1994.

Schmidt, H., et al.; The Charge Equalizer—A New System to Extend Battery Lifetime in Photovoltaic Systems, U.P.S. and Electric Vehicles; Societe Des Elecriciens Et Des Electroniciens, vol. 2, Sep. 27, 1993 and International Telecommunications Energy Conference. (INTELEC), Paris, Sep. 27–30, 1993.

BATTERY MANAGEMENT SYSTEM

This application is a continuation of application Ser. No. 08/412,197, filed Apr. 3, 1995 now abandoned.

All of the material in this application is subject to copyright protection under the copyright laws of the United States and of other countries. As of the first effective filing date of the present application, this material is protected as unpublished material.

However, permission to copy this material is hereby granted to the extent that the owner of the copyright has no objection to the facsimile reproduction by anyone of the patent document or patent disclosure, as it appears in the United States Patent and Trademark Office patent file or records, but otherwise reserves all copyright rights whatsoever.

BACKGROUND OF THE INVENTION

The present invention relates generally to the field of battery management systems, and more specifically it relates to control systems for controlling and monitoring the charging of rechargeable batteries.

The use of electrically powered vehicles has in recent years come to the forefront of efforts to conserve precious reserves of fossil fuels and reduce emissions of air pollutants. Electrically powered vehicles typically rely upon a battery power pack consisting of a plurality of batteries connected in series to provide motive force for the vehicles. Such battery power packs require periodic recharging and consequently some form of management to maintain the batteries at optimum charging conditions.

Conventional battery management systems provide management and control of the charging of such battery power packs by means of a programmed central processing unit which in turn controls a single direct current charger which provides a variable charging current. Such conventional systems also typically utilize sensors which provide feedback signals based on the entire battery pack rather than individual modules. Such conventional systems then utilize various charging algorithms to provide a full battery charge to the entire battery pack by means of the single direct current charger.

Reliance, in conventional battery systems, upon a single direct current charger to provide charging current for the individual battery modules results in an inability to provide individual charging currents on an independent basis to the individual battery modules. Such conventional battery systems consequently are incapable of precise charging of a plurality of rechargeable batteries connected in series to a "full" condition, thus resulting in batteries which are either undercharged or overcharged thereby reducing the useful life of the batteries.

The present invention provides a battery management system in which a programmed central processing unit provides management and control of a plurality of battery modules, wherein each battery module includes a direct current charger in the form of a DC/DC converter. This permits the system to controllably provide a separate and independent charging currents to each battery module. The present invention thus permits a plurality of rechargeable batteries to be bulk charged to a predetermined level approximately equal to 93% of a "full" charge, and then individually charged to a "full" condition by means of DC/DC converters operating independently of one another and positioned within each of the battery modules.

SUMMARY OF THE INVENTION

In accordance with one aspect of the present invention, there is provided a battery management system comprising a programmed central processing unit in communication with a plurality of battery modules. Each battery module comprises: a rechargeable battery; a sensor node that includes a temperature sensor, a voltage sensor, and a programmed microcontroller; and a direct current charger in the form of a DC/DC converter. The rechargeable batteries are, in turn, connected in series with a bulk charger, a control switch, and a current sensor. During the charging operation of the rechargeable batteries, the bulk charger, under the control of the programmed central processing unit, provides a bulk charging current. Throughout the charging operation, the sensor nodes continuously provide the operating temperature and terminal voltage for each of the rechargeable batteries to the programmed central processing unit.

When the terminal voltage for any one of the rechargeable batteries first meets or exceeds a predetermined clamping voltage, the bulk charging current is reduced by a value such as one half of its former value, the DC/DC converters for the rechargeable batteries are turned on, and the DC/DC converter for the rechargeable battery whose terminal voltage met or exceeded the predetermined clamping voltage is turned off. As charging of the batteries continues, whenever another rechargeable battery's terminal voltage meets or exceeds the predetermined clamping voltage, the bulk charging current is again reduced by approximately one half, and the DC/DC converter for the battery whose terminal voltage met or exceeded the predetermined clamping voltage is turned off. This process continues until the bulk charging current has been reduced to approximately 1 to 2 percent of the 3-hour discharge capacity for the rechargeable batteries. At this point, the bulk charging current supplied to the batteries is interrupted by means of the control switch, and the charging of rechargeable batteries are completed on an individual basis by means of the DC/DC converters. After completion of the charging operation, the batteries are maintained at a full and ready condition by charging individual batteries using the DC/DC converters.

BRIEF DESCRIPTION OF THE DRAWINGS

The foregoing and other advantages of the invention will become apparent upon reading the following detailed description and upon reference to the drawings in which.

DESCRIPTION OF PREFERRED EMBODIMENTS

Figure 1:
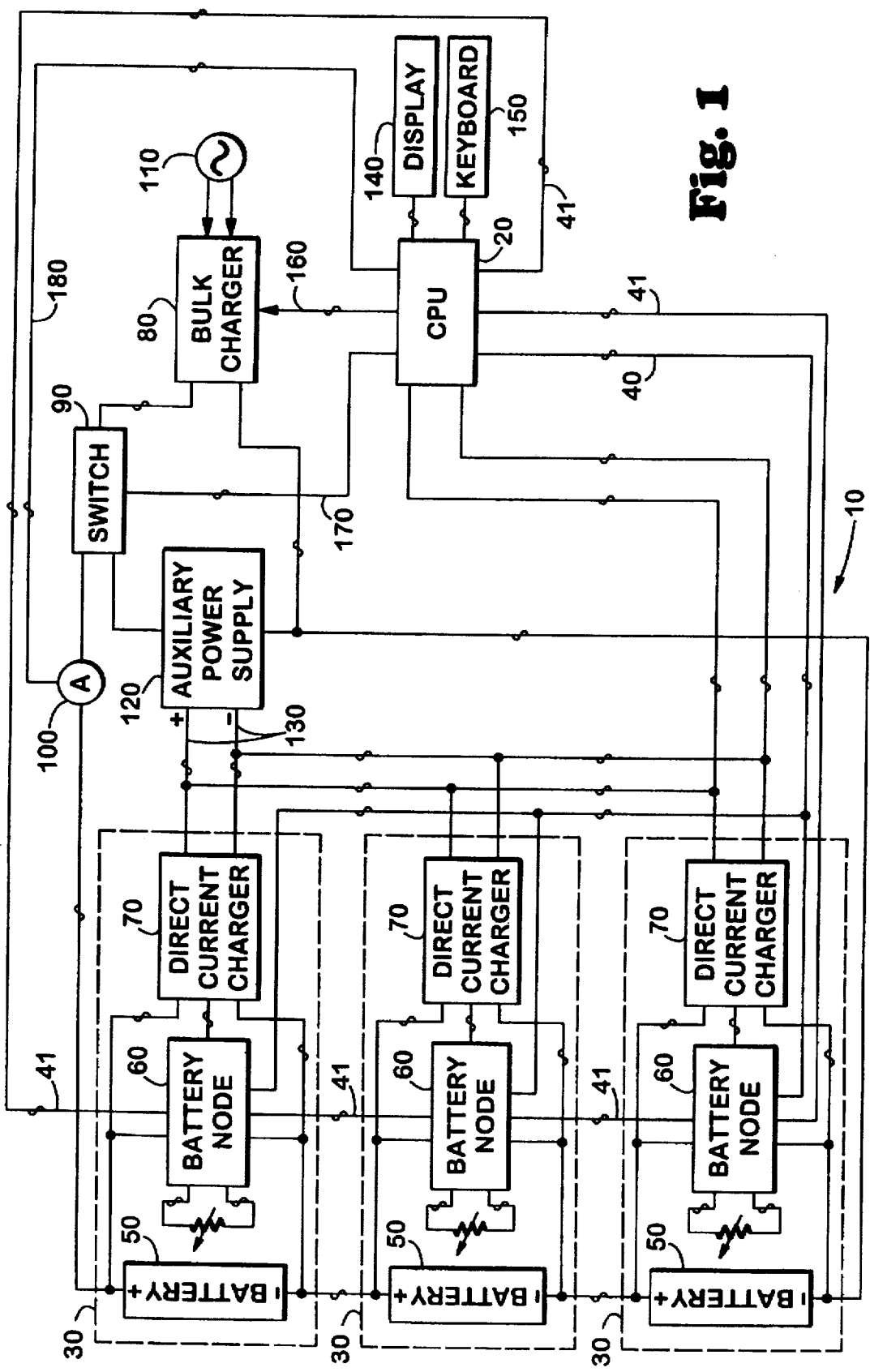
FIG. 1 is a schematic illustration of a battery management system with three battery modules.

Turning to the figures, the following description and the drawing figures pertain to an embodiment of the invention directed to a lead-acid storage battery management system intended to provide power to an electric vehicle. The system includes a battery pack including a plurality of lead-acid batteries connected in series to be installed in a vehicle. Also to be installed in the vehicle are separate DC chargers for each battery, a sensory system for monitoring the batteries, an auxiliary power supply, various electrical connections permitting the system to be powered by a central or bulk charger, and instrumentation such as a programmed central processing unit (CPU) and microcontrollers located at each battery for performing various battery management functions. The CPU or other instrumentation records data from the sensory system, displays the data, coordinates charging of the individual batteries by the bulk charger and the individual DC chargers, processes input data, and generates various control signals to permit the management of the lead-acid batteries.

It will be recognized that other specific systems of the invention for other specific lead-acid battery systems, nickel-cadmium battery systems, etc. may typically require different operating voltages, operating conditions, and electrical components other than those described herein. It will be further recognized, however, that the principles and examples described herein are clearly applicable to such other systems.

Turning to FIG. 1, there is illustrated a battery management system 10. A programmed central processing unit (CPU) 20 monitors and controls a plurality of battery modules 30. The CPU 20 communicates with the battery modules 30 by means of a serial interface 40 and a signal port interface 41. Each battery module 30 includes a rechargeable battery 50, a battery node 60, and a direct current charger 70. The rechargeable batteries 50 are connected in series with a bulk charger 80, a control switch 90, and a current sensor 100. An AC power supply 110 provides power for the bulk charger 80. An auxiliary DC power supply 120, which may be powered by the bulk charger 80, provides DC power to the battery modules 30 by means of a power bus 130. A display unit 140 provides a display of the operation of the CPU 20, and a keyboard 150 provides a means of data input to the CPU 20.

The CPU 20 includes a programmable central processing unit and associated data I/O. The CPU 20 may be any general purpose programmable computer such as one based upon, for example, an INTEL or MOTOROLA microprocessor based architecture.

The CPU 20 controls the operation of the bulk charger 80 by means of a bulk charger control signal 160 in a well known manner. In a preferred embodiment, the bulk charger control signal 160 transmitted by the CPU 20 to the bulk charger 80 is a pulse width modulated signal, as is well known in the art. The bulk charging current is variable and typically proportional to the pulse width modulated signal 160.

The CPU 20, by means of a control signal 170, controls the operation of a standard control switch 90, which in a preferred embodiment is a standard single-pole/single-throw switch. The position of the control switch 90 is dependent upon the operating state of the system 10. During a charging operation, with a bulk charging current provided by the bulk charger 80 to the batteries 50, the batteries 50, auxiliary power supply 120, and bulk charger 80 are all connected. This permits the bulk charger 80 to provide a bulk charging current to the batteries 50 and also permits the auxiliary power supply 120 to provide power to each of the direct current chargers 70. During a charging operation, with a bulk charging current not provided by the bulk charger 80, the auxiliary power supply 120 is connected to the bulk charger 80. This permits the auxiliary power supply 120 to provide power to each of the direct current chargers 70.

Finally, when the system 10 is idle or during discharging of the batteries 50, the batteries 50, the auxiliary power supply 120, and the bulk charger 80 are all connected. This permits the auxiliary power supply 120 to be powered by the batteries 50 when the bulk charger 80 has been disconnected from the AC power supply 110 by the CPU 20.

The current sensor 100 provides a signal 180 representative of the current level of the instantaneous level of the charging current provided by the bulk charger 80. The current sensor 100 may be any standard current sensor that provides an output signal. In a preferred embodiment, the current sensor is a model HTA 500-S, manufactured by LEM of Milwaukee, Wis. Such a sensor provides a current measurement during discharge of 0 to 500 amps with an accuracy of ±2 amps, and a current measurement during charging of 0 to 50 amps with an accuracy of ±200 mA.

The auxiliary DC power supply 120 is preferably a DC/DC converter powered by either the batteries 50 in the battery pack or by the bulk charger 80.

The system 10 includes a standard display 140 and keyboard 150 for use with the CPU 20. In an alternative embodiment, the system 10 may be installed in a motor vehicle with the display 140 and keyboard 150 provided within the passenger compartment. In another alternative embodiment, a diagnostic port may be positioned on the CPU 20, in a well known manner, to permit a service technician to access all of the information stored in the memory of the CPU 20 so that the service technician may perform repairs and scheduled maintenance on the system 10. In this manner, the battery management system 10 permits service technicians to directly access the operating parameters of the system 10 and further access the operating history of the battery modules 30.

Figure 2:
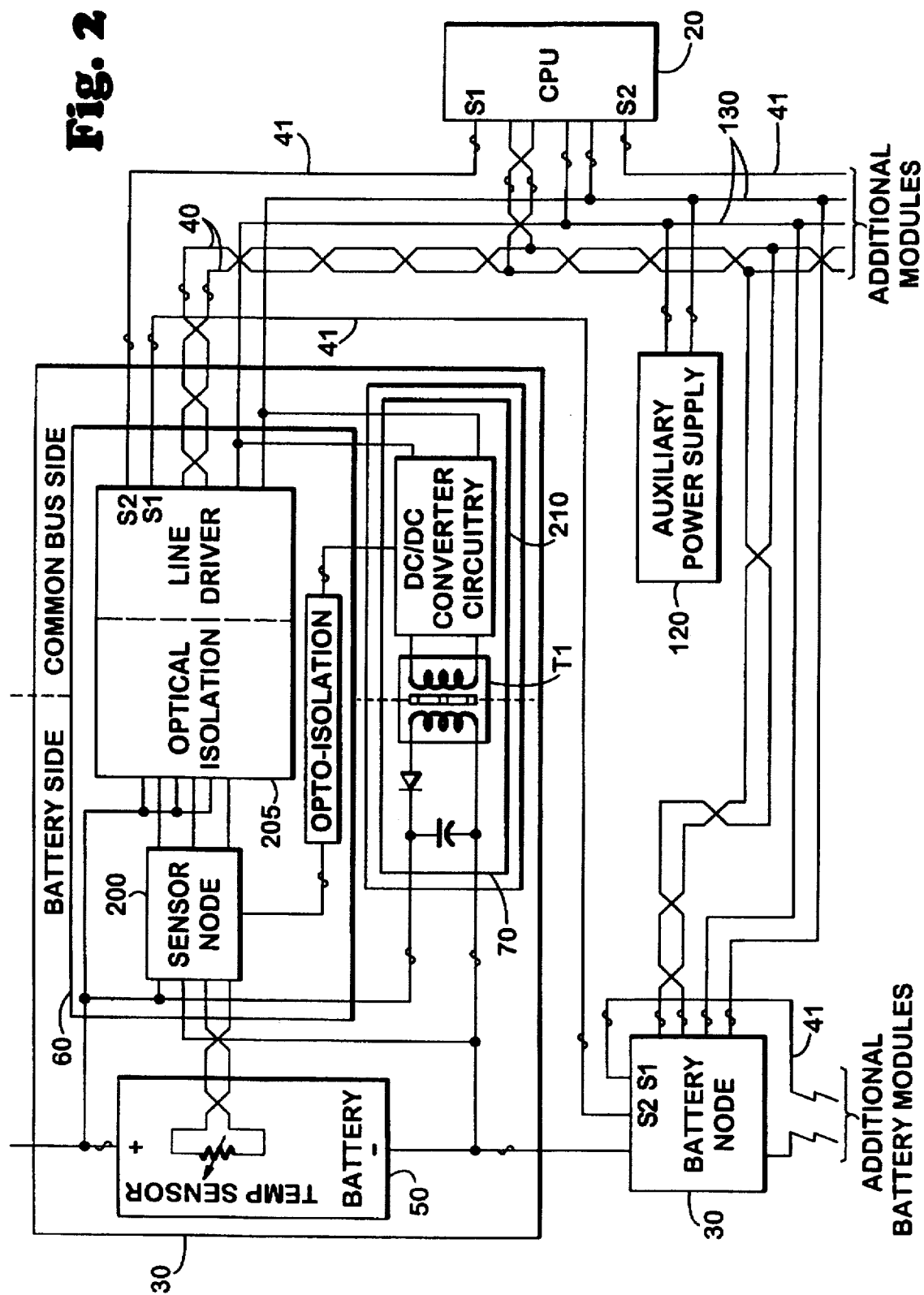
FIG. 2 is a schematic illustration of one of the battery modules of FIG. 1.

Referring to FIG. 2, each battery module 30 includes a rechargeable battery 50, a battery node 60, and a direct current charger 70. Each battery node 60 includes a sensor node 200 and a line driver 205. Each direct current charger 70 includes a DC/DC converter 210.

The battery node 60 monitors the operation of the battery 50 by means of the sensor node 200 and communicates the status of the rechargeable battery 50 to the CPU 20 using a serial data communications protocol by means of the line driver 205. In a preferred embodiment, the sensor node 200 and the line driver 205 are optically isolated from one another by means of a plurality of optical isolators common to the line driver 205 to protect the CPU 20 from damage.

The direct current charger 70 provides a charging current to the rechargeable battery 50 by means of the DC/DC converter 210. A transformer T1, within the DC/DC converter 210, provides isolation between the rechargeable battery 50 and the power bus 130. In an exemplary embodiment, the DC/DC converter 210 receives the power bus 130 voltage of approximately 9 to 16 volts DC and outputs a charging current to the rechargeable battery 50. In a preferred embodiment, the converter 210 outputs a charging current having an average value of approximately 1 amp. The DC/DC converter 210 is directly controlled by a signal generated by the sensor node 200. In a preferred embodiment, the sensor node 200 is optically isolated from the DC/DC converter 210 in order to protect the sensor node 200 from damage.

In another preferred embodiment, the average charging current output by the direct current charger 70, in the form of the DC/DC converter 210, is set at approximately 1 percent of the 3-hour discharge capacity of the battery 50. Thus, a battery with a 3-hour discharge capacity of 100 amp-hours would be provided a charging current having an average value of approximately 1 amp.

Communication between the CPU 20 and the sensor nodes 200 and line drivers 205 is accomplished by means of serial communications and node serialization incorporating the industry standard RS-485 communications protocol. The CPU 20 may be programmed in a known manner using any number of high level programming languages to permit communication with and control of the plurality of battery modules 30. The software utilized by the CPU 20 includes the serial communication and node serialization commands, a battery management system main program, and a battery management system one-second interrupt program.

Figure 3:
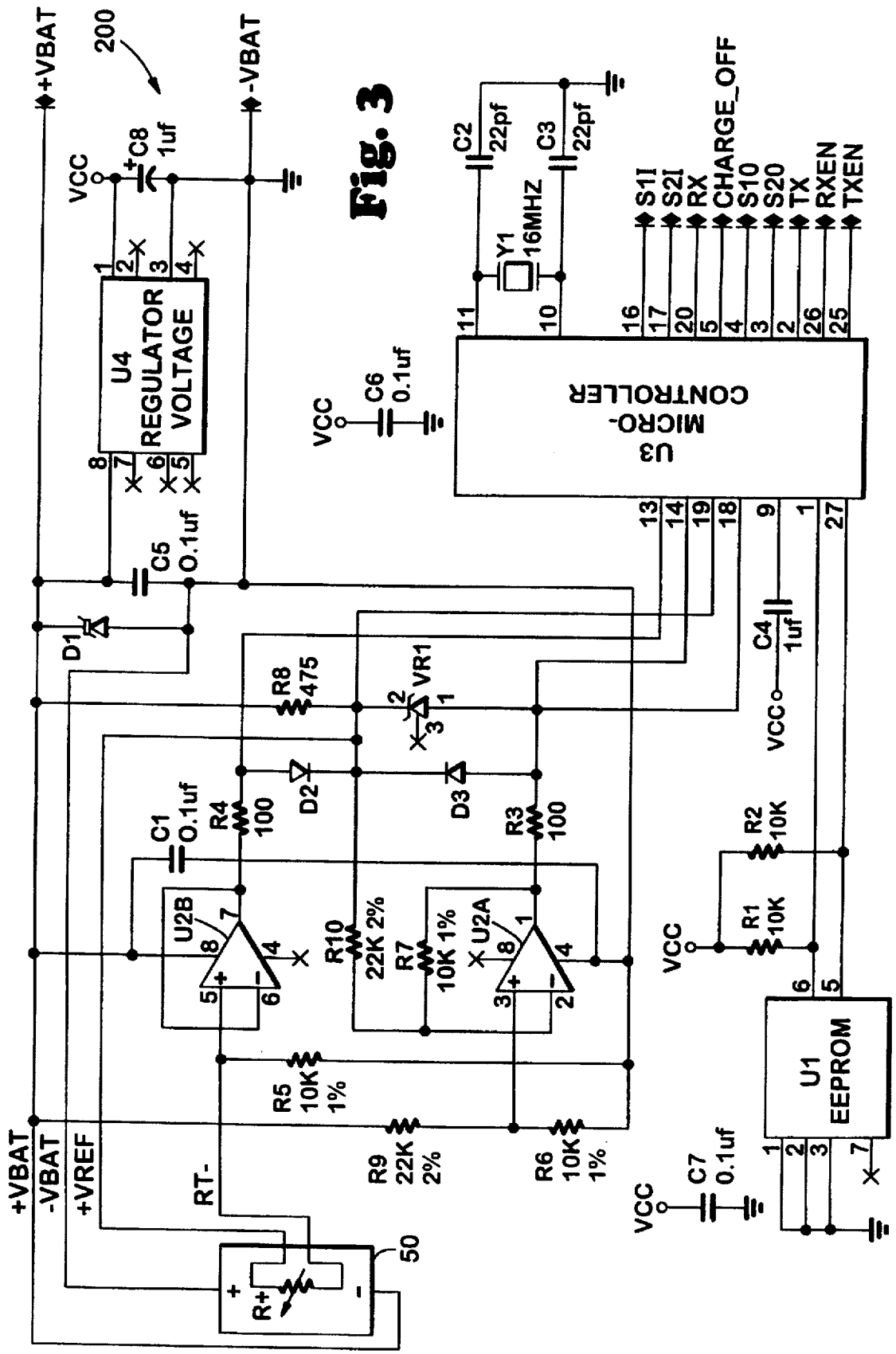
FIG. 3 is are a schematic illustration of a sensor node.

Referring now to FIG. 3, the sensor node 200 will now be described.

The sensor node 200 includes resistors R1, R2, R5, R6, R9, and R10, capacitors C1, C2, C3, C4, C5, C6, C7, and C8, diodes D2 and D3, zener diodes D1 and VR1, an EEPROM U1, operational amplifiers U2A and U2B, a microcontroller U3, a voltage regulator U4, and a thermistor $R_t$.

The thermistor $R_t$, mounted on the rechargeable battery 50 responds to temperature changes of the rechargeable battery 50. The sensor node 200 is typically capable of temperature measurements ranging from about −40° C. to +50° C. with a resolution of ±2° C. by virtue of the thermistor $R_t$. In a preferred embodiment, the thermistor $R_t$ is a model WN222 temperature sensor, available from the Sensor Scientific Company of New Jersey. The sensor node 200 further provides a voltage measurement range of about 9–16 VDC with an accuracy of ±25 mV. The operating range of the sensor node 200 ranges from about −40° C. to +50° C. In a well known manner, the thermistor $R_t$ provides a measurement of the temperature of the rechargeable battery 50 by virtue of its negative temperature coefficient of resistance. The varying resistance of the thermistor $R_t$ generates a varying voltage signal RT- on an input to a standard operational amplifier U2B. The varying voltage signal RT- is amplified by the operational amplifier U2B and sent to an A/D converter within a microcontroller U3.

Any number of industry standard 8-bit microcontrollers may be used. In a preferred embodiment, the microcontroller U3 is an 8 bit 87C752 microcontroller manufactured by North American Phillips. The microcontroller U3 includes standard inputs and outputs which include: digital I/O at pins 2, 3, 4, 5, 16, 17, 20, 25, and 26; read/write access to the EEPROM U1 via pins 1 and 27; clock inputs at pins 10 and 11; a reset input at pin 9; A/D inputs at pins 13, 14, 18, and 19. The operation and performance characteristics of the microcontroller U3 are considered well known.

A rechargeable battery terminal voltage signal +VBAT representative of the terminal voltage across the terminals of the rechargeable battery 50 is sent through a voltage divider consisting of resistors R9 and R6. In an exemplary embodiment, R9 is 22K resistor and R6 is a 10K resistor. The +VBAT signal is then fed through a standard operational amplifier U2A and the amplified signal is then sent to the A/D converter within the microcontroller U3. The microcontroller U3 is thus able to monitor at all times the operating temperature and terminal voltage of the rechargeable battery 50.

An standard EEPROM U1 permits the microcontroller U3 to store certain parameters nonvolatilely, so that if the sensor node 200 ever loses power those registers are maintained. The EEPROM U1 includes pins 1, 2, and 3 connected to ground, pins 5 and 6 which provide read/write access to the EEPROM U1 storage registers connected to pins 1 and 27 of the microcontroller U3, and a test connection at pin 7. The operation and performance characteristics of the EEPROM U1 are considered well known.

The microcontroller U3 contains algorithms which allow the sensor node 200 to sense the rechargeable battery terminal voltage and rechargeable battery operating temperature and communicate with the CPU 20. The microcontroller U3 further contains conventional circuitry that performs the analog to digital conversion, conventional algorithms which allow it to communicate with the EEPROM U1, and conventional algorithms which allow it to send the logic signals to the line driver 205 and receive the logic signals from the line driver 205.

Capacitors C1, C2, C3, C4, C5, C6, C7, and C8 are included in the sensor node 200 for decoupling, to get rid of high frequency noise as is well known in the art.

The crystal Y1 provides a clock source for the microcontroller U3 as is well known in the art. In a preferred embodiment a 16 megahertz crystal is utilized as a clock source for the microcontroller U3 at pins 10 and 11.

The sensor node 200 further includes an industry standard +5 volt programmable low dropout voltage regulator U4 which receives +VBAT at pin 8, which is typically about +12 volts, and generates a regulated +5 volt power supply VCC at pin 1 for the sensor node 200. The regulator U4 further includes pins 2, 4, 5, 6, and 7 which are unconnected, and pin 3 which is tied to −VBAT, which is typically about 0 volts. The operation and performance characteristics of the voltage regulator U4 are considered well known.

VCC is a 5 volt signal generated from the voltage regulator U4 on the sensor node 200. +VBAT, which in an exemplary embodiment is about 12 volts, is the positive side of the rechargeable battery 50. −VBAT, which is nominally ground, is the negative side of the rechargeable battery 50. TX is transmitted data which is output from pin 2 of the microcontroller U3. RX is data received from the serial interface 40 that has been optically isolated and is sent back to the sensor node 200 and is received at pin 20 of the microcontroller U3. RXEN and TXEN are the receive and transmit enable signals for the line driver 205 which are transmitted from pins 26 and 25 of the microcontroller U3. CHARGE_OFF is a signal sent to the DC/DC converter 210 from pin 5 of the microcontroller U3 which turns the DC/DC converter 210 on and off. S1I and S2I are node serialization signals received at pins 16 and 17 of the microcontroller U3 while S1O and S2O are node serialization signals transmitted from pins 3 and 4 of the microcontroller U3.

The operational amplifier U2A utilizes resistors R6, R7, R9, and R10 for gain adjustment and offset adjustment in a well known manner. In an exemplary embodiment, resistors R6 and R7 are 10K resistors while resistors R9 and R10 are 22K resistors. These resistors determine a gain and offset for the operational amplifier U2A, and their function is to help ensure in an exemplary embodiment that an input voltage range of about 5 volts to 16 volts (which is the typical rechargeable battery terminal voltage for a lead-acid battery utilized in motor vehicles), is converted to an A/D range of about 0 volts to 5 volts.

The operational amplifier U2B, which receives the signal RT- from the thermistor $R_t$, utilizes a fixed resistor R5. In an exemplary embodiment, the fixed resistor R5 is a 10K resistor which ensures that the signal off the lower side of the thermistor $R_t$ throughout the temperature range from about −40° C. to +50° C. will be converted to a signal in the range of about 0 to 5 volts.

The resistors R1 and R2 permit communication between the microcontroller U3 and the EEPROM U1 in a well known manner. Resistors R3, R4, and R8, diodes D2 and D3, and zener diode VR1 facilitate operation of the A/D converter of the microcontroller U3 with the operational amplifiers U2A and U2B in a well known manner. The particular values for these components will vary, in a well known manner, as a function of the specific components chosen for the EEPROM U1, operational amplifiers U2A and U2B, and microcontroller U3 as well as the specific signal levels involved in a particular application of the system 10.

An industry standard zener diode D1 is provided to protect the A/D converter resident in the microcontroller U3 from over voltage.

The microcontroller U3 contains programs that permit it to monitor the rechargeable battery 50, update the nonvolatile registers of the EEPROM U1, communicate with the CPU 20 and control the DC/DC converter 210. The programs utilized by the microcontroller U3 include a sensor node main program, serial communication and node serialization algorithms, and a one-second interrupt. More detailed program steps of the sensor node main program and sensor node one-second interrupt are discussed with reference to FIGS. 7 and 8.

In the preferred embodiment disclosed herein, the component parts used in the sensor node 200 include: R1, R2, R5, R6, R7 which are 10K resistors; R9 and R10 which are 22K resistors; C1, C5, C7 which are 0.1 uF capacitors; C2 and C3 which are 22 pF capacitors; C4 and C8 which are 1 uF capacitors; D2 and D3 which are diodes, part no. 1N5818MCT, available from Motorola; D1 which is a diode, part no. 1.5SMC20AT3, available from Motorola; VR1 which is a diode, part no. LT1029CZ, available from Linear Tech Inc.; U1 which is a 256 Byte EEPROM, part number PCF8582E2D, available from North American Phillips; U2A and U2B which are operational amplifiers, part no. LM358M, available from National Semiconductor; U3 which is a 8-bit microcontroller, part no. S87C752-1DB, available from North American Phillips; a voltage regulator U4, part no. LT 1121 CS8-5, available from Linear Tech Inc.; and a thermistor $R_t$, model no. WN222, available from the Sensor Scientific Company of New Jersey.

Figure 4:
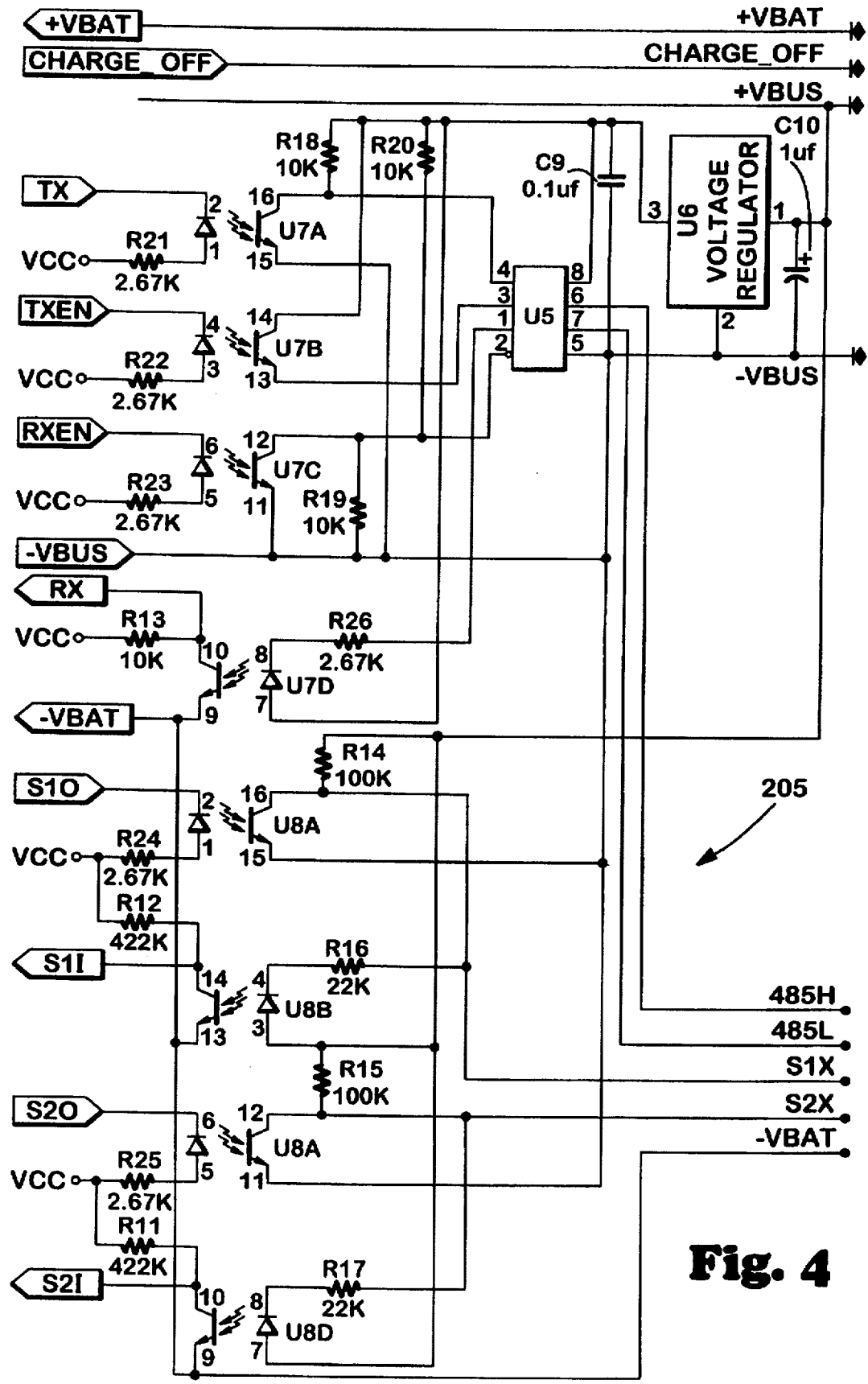
FIG. 4 is a schematic illustration of a line driver with optical isolation.

Referring now to FIG. 4, the line driver 205 will now be described.

The line driver 205 translates logic level signal TX from the sensor node 200 into signals 485L and 485H over the serial data bus 40, and also translates serial signals 485L and 485H back to logic level signal RX, maintains isolation between the serial data bus 40 and the +VBAT and −VBAT signals, and permits serialization of the battery nodes 60 by transmitting and receiving the signals S1X and S2X.

The line driver 205 includes resistors R11, R12, R13, R14, R15, R16, R17, R18, R19, R20, R21, R22, R23, R24, R25, and R26, capacitors C9 and C10, optocouplers U7A, U7B, U7C, U7D, U8A, U8B, U8C, and U8D, an RS-485 driver/receiver U5, and a voltage regulator U6.

The line driver 205 receives signals +VBUS, TX, VCC, TXEN, RXEN, −VBUS, S1O, S2O, 485H, 485L, S1X, and S2X. +VBUS/−VBUS are provided by the power bus 130. The signal TX is data transmitted from the sensor node 200. The signals RXEN and TXEN are the enable signals for the line driver 205 and transmitted by the sensor node 200. S1O and S2O are the node serialization signals transmitted by the sensor node 200. VCC is the 5 volt signal generated from the voltage regulator U4 on the sensor node 200.

The signal +VBUS in turn powers the line driver 205 by means of a +5 volt voltage regulator U6. The voltage regulator U6 provides a 5 volt supply VOUT for a RS-485 driver/receiver U5. The voltage regulator U6 receives +VBUS at pin 1 and outputs VOUT at pin 3 while pin 2 is tied to −VBUS. The operation and performance characteristics of the voltage regulator U6 are considered well known.

The driver/receiver U5 is manufactured by MAXIM of Sunnyvale, Calif. It is an industry standard RS-485 driver/receiver. The driver/receiver U5 transmits and receives signals 485L and 485H at pins 6 and 7. Pin 5 is connected to −VBUS while pin 8 is connected to VOUT generated by the voltage regulator U6. Pin 4 is connected to optocoupler U7A and thereby receives data transmitted by the sensor node 200 to the line driver 205. Pin 3 is connected to optocoupler U7B that enables data transmission from the line driver 205 to the serial data bus 40. Pin 1 is connected to optocoupler U7D and thereby transmits data from the line driver 205 to the sensor node 200. Pin 2 is connected to optocoupler U7C that enables the transmission of data from the line driver 205 to the sensor node 200. The operation and performance characteristics of the RS-485 driver/receiver U5 are considered well known.

The signal VCC, which is entirely isolated from the +VBUS bus, powers the light emitting diode portion of the optocouplers U7A, U7B, U7C, U8A, and U8C, signal VOUT powers the light emitting diode portion of the optocouplers U7D, and +VBUS powers the light emitting diode portion of the optocouplers U8B and U8D. The optocouplers U7A thru U8D are industry standard devices having high speed transistor outputs. The optocouplers provide isolation of about 500 volts DC. The operation and performance characteristics of the optocouplers are considered well known.

The signal TX is the transmitted data signal received by the line driver 205 from the sensor node 200. When the magnitude of the signal TX is less than the magnitude of the signal VCC, the light emitting diode within the optocoupler U7A illuminates and the optocoupler U7A transmits a signal to the driver/receiver U5.

The signal −VBUS is the negative side of the 12 volt power supply for the line driver 205 and it is also isolated from VCC.

The signals RXEN and TXEN are the enable signals which are optically isolated through the optocouplers U7B and U7C.

The line driver 205 communicates with the CPU 20 by means of signals S1X, S2X, 485H, and 485L. The signals S1X and S2X allow the CPU 20 to assign addresses and locate individual sensor nodes 200 as a part of the implementation of the serial communications and node serialization procedure. The use of the signals S1X and S2X is described in detail in the discussion of the serial communications and node serialization of the battery management system 10. The signals 485L and 485H are serial data transmitted and received by the line driver 205 to and from the CPU 20.

The signal RX is received data from the serial interface 40 that has been optically isolated and is sent back to the sensor node 200.

The signal −VBAT is the negative side of the rechargeable battery 50 and it is optically isolated from the +VBUS/−VBUS.

Capacitors C9 are C10 are included in the line driver 205 for decoupling, to eliminate high frequency noise as is well known in the art. Resistors R11, R12, R13, R14, R15, R16, R17, R18, R19, R20, R21, R22, R23, R24, R25, and R26 are included in the line driver to permit proper operation of the optocouplers U7A through U8D in a well known manner. The specific values for these components will vary, in a well known manner, as a function of the specific components chosen as well as the signal levels for a specific application of the system 10.

In the preferred embodiment disclosed herein, the component parts used in the line driver 205 include: R11 and R12 which are 422K resistors; R13 which is a 10K resistor; R14 and R15 which are 100K resistors; R16 and R17 which are 22K resistors; R18, R19, and R20 which are 10K resistors; R21, R22, R23, R24, R25, and R26 which are 2.67K resistors; C9 which is a 0.1 uF capacitor; C10 which is a 1 uF capacitor; opto-isolators U7A, U7B, U7C, U7D, U8A, U8B, U8C, and U8D, part numbers PS2501-4, manufactured by Nippon Electric Corporation; an RS485 driver/receiver U5, part number MAX487CSA, manufactured by MAXIM of Sunnyvale, Calif.; and a voltage regulator U6, part number MC78M05CT, manufactured by Motorola.

Figure 5:
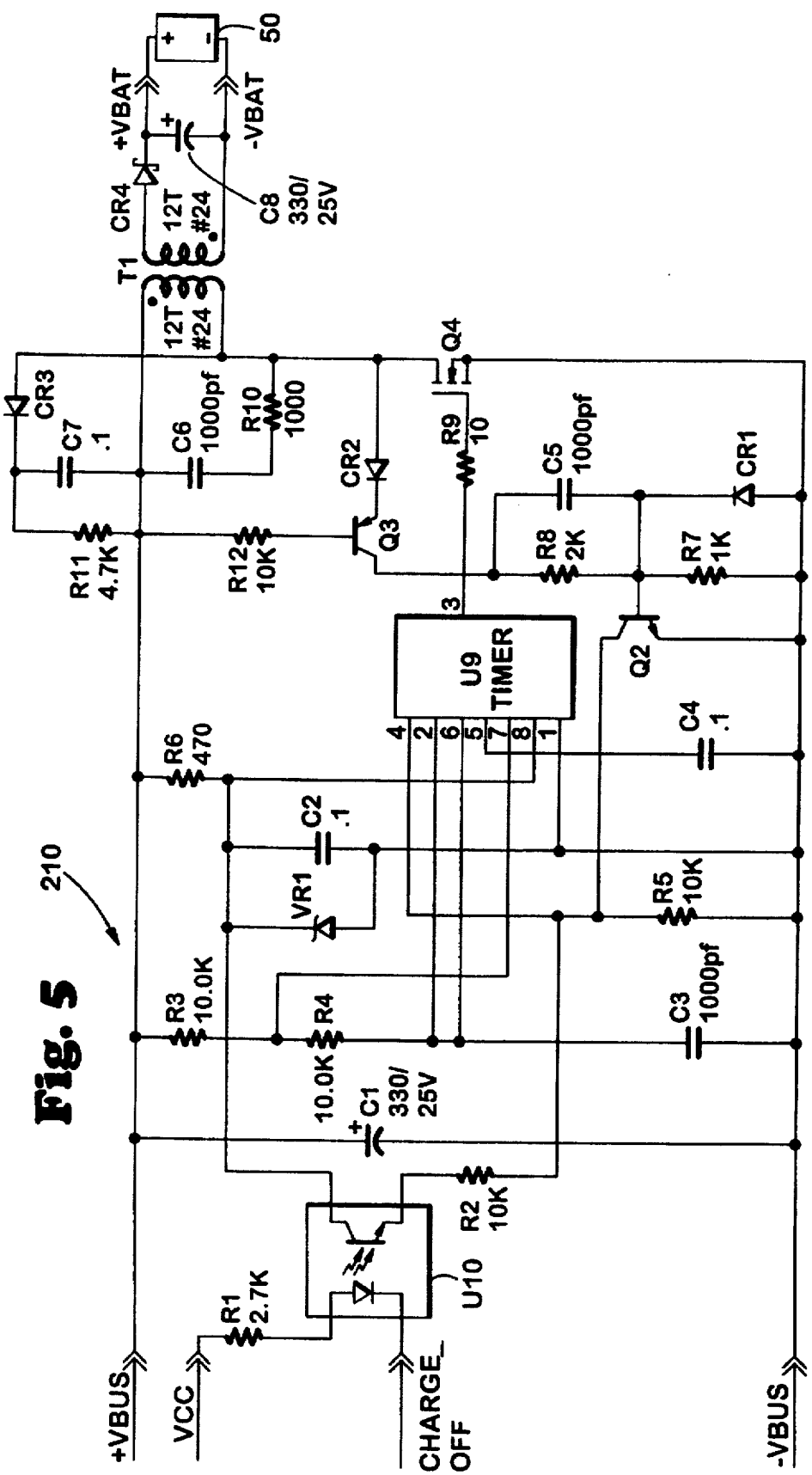
FIG. 5 is a schematic illustration of a DC/DC converter.

Turning now to FIG. 5, the DC/DC converter 210 will now be described.

The DC/DC converter 210 includes resistors R1, R2, R3, R4, R5, R6, R7, R8, R9, R10, R11, and R12, capacitors C1, C2, C3, C4, C5, C6, C7, and C8, diodes CR1, CR2, and CR3, zener diodes ZR1 and CR4, transistors Q1, Q2, Q3, and Q4, CMOS timer U9, optocoupler U10, and transformer T1.

The purpose of the DC/DC converter 210 is to transfer energy from the common voltage bus 130 (indicated by +VBUS/−VBUS) to the rechargeable battery 50. It operates in a current mode which allows energy to be transferred, regardless of the bus voltage range compared to the rechargeable battery terminal voltage, within certain limits. Typical limitations would be bus voltage from about +6 v to +24 v and a rechargeable battery voltage from about +6 v to +16 v. The DC/DC converter 210, on or off state, is controlled from the CPU 20, by means of the signal CHARGE_OFF generated by the sensor node 200, based upon the charging requirements as controlled by the main program for the battery management system.

In a preferred embodiment the circuit parameters are set to deliver an average current of approximately 1 percent of the 3-hour discharge capacity of the rechargeable battery 50 when the DC/DC converter 210 is enabled. In an exemplary embodiment, for a battery 50 with a 3-hour discharge capacity of 100 amp-hours, the DC/DC converter 210 provides an average current of 1 amp to the rechargeable battery 50 when the DC/DC converter 210 is enabled.

The DC/DC converter 210 is a "flyback" type wherein energy is alternately transferred from the power bus 130 (+VBUS/−VBUS) to the transformer T1 core, then from the core to the rechargeable battery 50. In the first half of the cycle, a transistor Q4 is "ON" which impresses the bus voltage across the primary of the transformer T1. A current ramp is begun which follows the equation:

Current=Bus voltage×Time ON/Primary inductance

Figure 6:
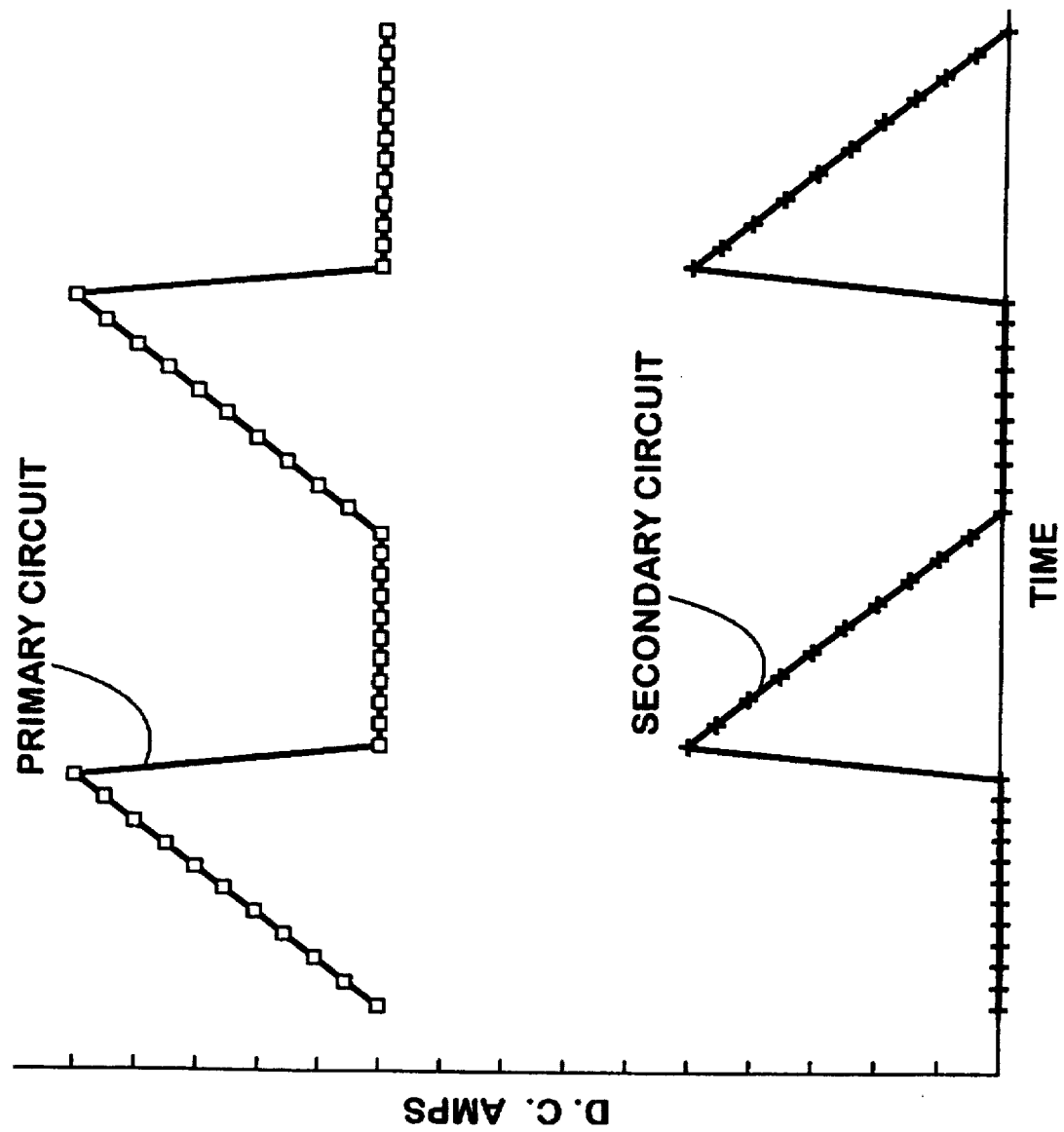
FIG. 6 is a graphical illustration of the transformer current waveforms of the DC/DC converter.

When Q4 is turned "OFF", the core energy is transferred to the rechargeable battery 50 according to the same equation. The current waveforms for the primary and secondary of the transformer T1 are illustrated in FIG. 6. The current ramp peaks are controlled in a well known manner to provide an average current flow to the rechargeable battery 50 of approximately 1 percent of the 3-hour discharge capacity of the rechargeable battery 50. In an exemplary embodiment, for a battery 50 with a 3-hour discharge capacity of 100 amp-hours, the DC/DC converter 210 provides an average current of 1 amp ±250 mA to the rechargeable battery 50.

Referring back to FIG. 5, U10 is an optocoupler which provides isolated OFF/ON control of the DC/DC converter 210. When the optocoupler U10 is ON, the DC/DC converter 210 is ON.

The CMOS timer U9 includes standard inputs and outputs which include: a connection to ground GND at pin 1, a trigger input TRIG at pin 2, an output signal OUT at pin 3, a reset input RESET at pin 4, a control input CONT at pin 5, an input threshold THRESH at pin 6, a discharge input DISCH at pin 7, and a power supply input VDD at pin 8. The operation and performance characteristics of the CMOS timer U9 are considered well known.

The CMOS timer U9 is configured in a well known manner as an astable oscillator which outputs a square wave of approximately 50% duty cycle when free running with a bus voltage of +12 v. For oscillations to occur, the RESET voltage on pin 4 of U9 must be greater than approximately 1 volt. The time constants for the oscillator U9 are determined in a well known manner by resistors R3, R4, and capacitor C3. As the bus voltage is increased above 12 volts, a zener diode VR1 clamps the input voltage on pin 8 of U9 to +12 volts while the timing resistor R3 remains connected directly to +VBUS. As the bus voltage increases, the charge current through R3 increases to C3 and decreases the ON time of the circuit. This balances the product of bus voltage and ON time in the above equation, so as to provide a constant peak in the current ramp each cycle. This helps to prevent variations in bus voltages from radically changing the battery charging current. As the bus voltage decreases below 12 v, the DC/DC converter 210 continues to operate, but at a reduced current.

The OFF time during actual circuit operation, in lieu of free running, is determined by the core dump time of the transformer T1. Core dump is sensed by monitoring the drain voltage of Q4. Until dump is completed, the drain voltage is higher than the bus voltage. Before dump is complete, transistor Q3 is turned ON through diode CR2. This turns ON transistor Q2 which holds U9 in the RESET condition and prevents the next ON cycle. Immediately after dump the drain voltage drops below the bus voltage and RESET is released, thereby initiating the next charge cycle. A resistor R10 and a capacitor C6 provide damping for the parasitic oscillations when Q4 is turned OFF. A resistor R11, capacitor C7, and a diode CR3 clamp the leakage spike after Q4 turns OFF and prevents damage to Q4. Capacitors C1 and C8 smooth out the current pulses during the charge/dump cycles, respectively. Zener diode CR4 is the output rectifier for the AC voltage appearing on the transformer T1 secondary.

The optocoupler U10 and transformer T1 both provide isolation of 500 volts DC, thereby protecting the battery management system components from voltage transients.

Other circuit elements in the DC/DC converter 210 simply provide the proper voltage/current control to maintain proper parameter needs in a well known manner. Their specific component values will vary, in a well known manner, as a function of the specific components selected for a specific application of the system 10.

In the preferred embodiment disclosed herein, the component parts used in the DC/DC converter 210 include: the optoisolator U10 which is an integrated circuit, optoisolator with photo transistor output, part number PS2501-1, manufactured by NEC; U9 which is an integrated circuit 555 timer, part number TLC555CP, manufactured by Texas Instruments; Q2 which is a transistor, part number MPS2222, manufactured by Motorola; Q3 which is a transistor, part number MPS2907, manufactured by Motorola; Q4 which is a transistor, part number IRFZ40, manufactured by Motorola; CR1, CR2, and CR3 which are all diodes, part numbers 1N4937, manufactured by Motorola; CR4 which is a diode, part number MBR390, manufactured by Motorola; VR1 which is a diode, part number 1N759A, manufactured by Motorola; R9 which is a 10 Ohm resistor; R10 which is a 100 Ohm resistor; R6 which is a 470 Ohm resistor; R7 which is a 1K Ohm resistor; R8 which is a 2K Ohm resistor; R1 which is a 2.7K Ohm resistor; R11 which is a 4.7K Ohm resistor; R2, R3, R4, R5, and R12 which are each 10.0K Ohm resistors; C3, C5, and C6 which are each 1000 pF capacitors; C2, C4, and C7 which are each 0.1 uF capacitors; C1 and C8 which are each 330 uF capacitors, rated at 25 v; and T1 which is a transformer having a turns ratio of 1:1.

Figure 7:
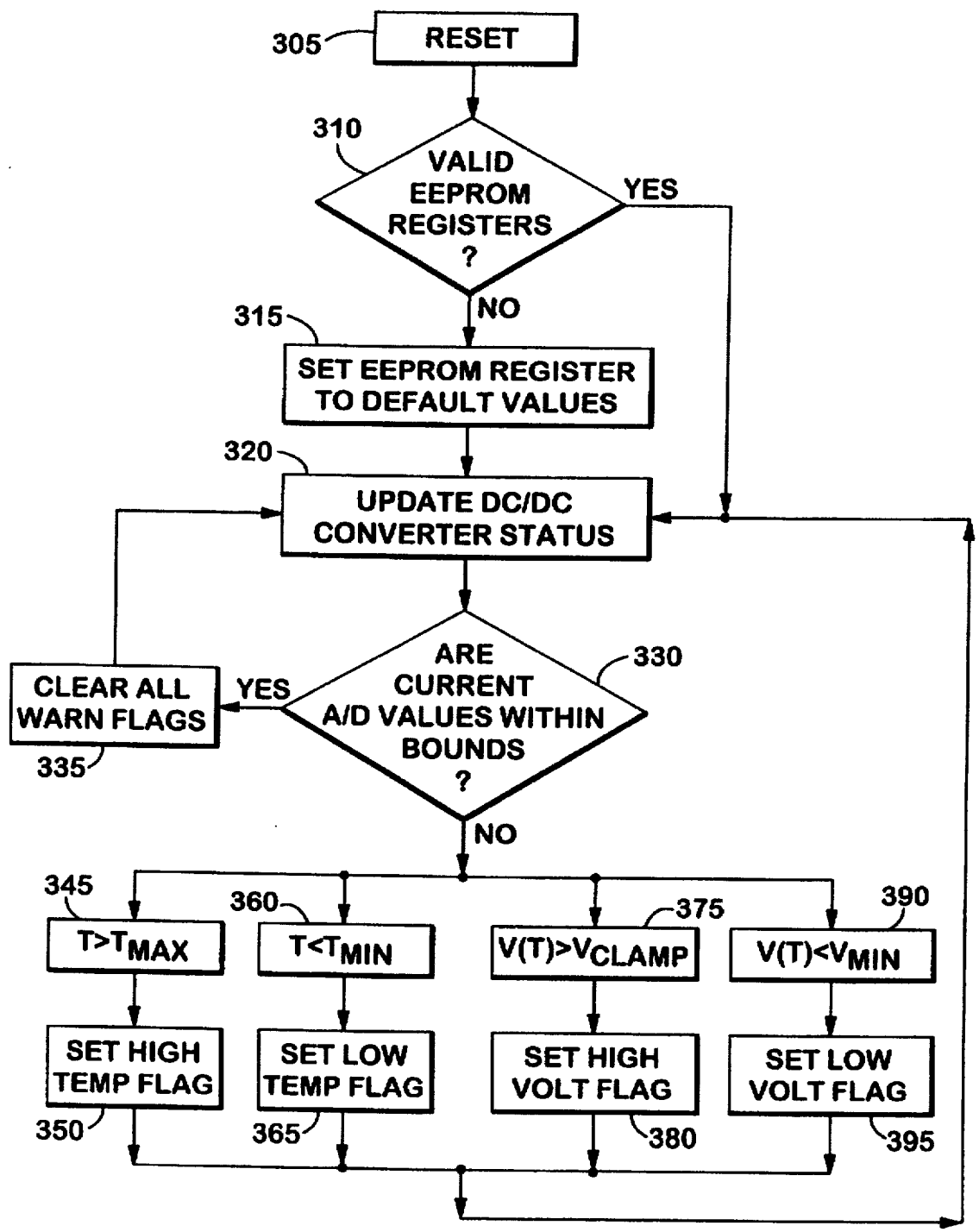
FIG. 7 is a flow chart diagram of the main program for a sensor node.

Referring to FIG. 7, the sensor node main program implemented by the microcontroller U3 of the sensor node 200 (see FIG. 3) will now be described.

After a reset of the microcontroller U3 by an external signal in step 305, the sensor node main program ensures in program step 310 that the values stored in the non-volatile memory of the EEPROM U1 are valid. Invalidity indicates a system failure or other error in the microcontroller U3. If the stored values are invalid, the sensor node main program resets the values to predetermined default values in program step 315, and then continues by updating the DC/DC converter status in program step 320. If the stored values are valid, the sensor node main program simply updates the DC/DC converter status in program step 320 by obtaining the DC/DC converter status from one of the microcontroller U3 registers. The DC/DC converter status will be either on or off. The microcontroller U3 will then turn the DC/DC converter 210 (illustrated in FIG. 5) on or off accordingly by means of the signal CHARGE_OFF.

The sensor node main program then determines whether the current measured values for the rechargeable battery operating temperature and terminal voltage that it has read on the A/D converters are within acceptable predetermined limits in program step 330. If the then current measured values for temperature and voltage are within acceptable predetermined limits, it clears all warning flags in program step 335 and returns to the loop of continuing to update the DC/DC converter 210, looking to see whether the measured values are within predetermined acceptable limits. If at any point the A/D values have gone beyond the predetermined acceptable limits, a determination is made of which type of warning flag to set.

The corresponding warning flag is set whenever: (1) the operating temperature of the rechargeable battery 50 exceeds the upper acceptable limit $T_{max}$; (2) the operating temperature of the rechargeable battery 50 is below the lower acceptable limit $T_{min}$; (3) the temperature compensated terminal voltage of the rechargeable battery 50 is greater than an upper limit $V_{clamp}$; and/or (4) the temperature compensated terminal voltage of the rechargeable battery 50 is less than a lower limit $V_{min}$.

The main program sets the appropriate warning flag depending on what condition has occurred in program steps 345, 350, 360, 365, 375, 380, 390, and 395. The sensor node main program then goes back and updates the DC/DC converter status again in program step 320 and reenters the primary program loop.

The temperature compensated terminal voltage of the rechargeable battery 50 is calculated in a well known manner by the microcontroller U3. In a preferred embodiment, the temperature compensated battery terminal voltage is referenced to a temperature of about 25° C.

Figure 8:
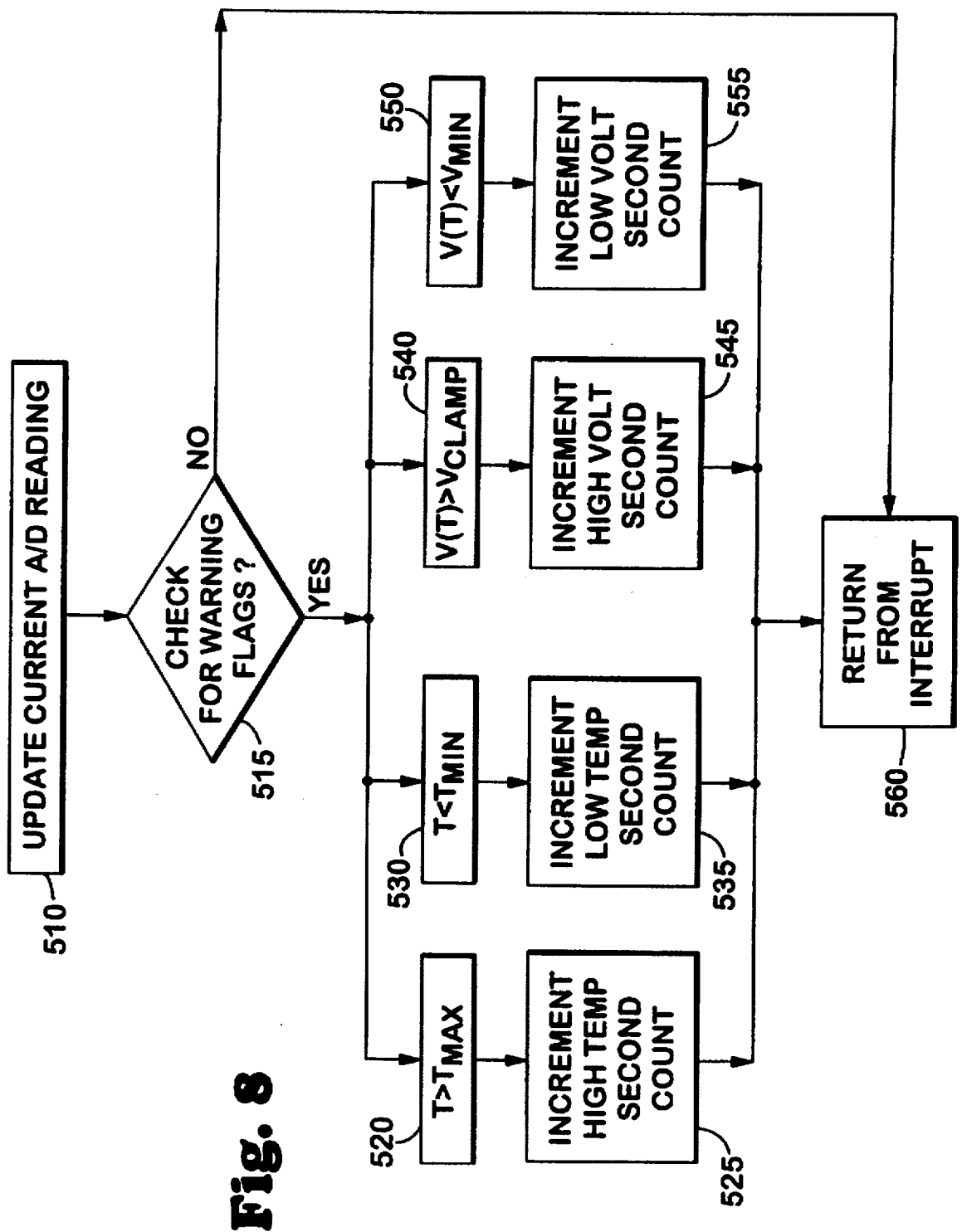
FIG. 8 is a flow chart diagram of the sensor node one-second interrupt program.

Referring to FIG. 8, the sensor node one second interrupt implemented by the microcontroller U3 of the sensor node 200 (see FIG. 3) will now be described.

The sensor node one second interrupt first updates the current A/D readings by taking another reading of the operating temperature and the terminal voltage of the rechargeable battery 50 and updating the register in program step 510.

The sensor node one second interrupt program then checks for the presence of warning flags in program step 515. If there are no warning flags, the microcontroller U3 returns from the interrupt to the sensor node main program in program step 560. If there is a warning flag, the microcontroller U3 increments a counter which counts how many seconds that particular warning flag has been active.

A warning flag indicating that the operating temperature T of the rechargeable battery 50 exceeds a predetermined maximum operating temperature $T_{max}$ results in incrementing a high temperature second counter in program steps 520 and 525. A warning flag indicating that the operating temperature T of the rechargeable battery 50 is less than a predetermined minimum operating temperature $T_{min}$ results in incrementing a low temperature second counter in program steps 530 and 535. A warning flag indicating that the temperature corrected terminal voltage V(T) of the rechargeable battery 50 exceeds a predetermined clamping voltage $V_{clamp}$ results in incrementing a high voltage second counter in program steps 540 and 545. A warning flag indicating that the temperature corrected terminal voltage V(T) of the rechargeable battery 50 is less than a predetermined minimum voltage $V_{min}$ results in incrementing a low voltage second counter in program steps 550 and 555.

The warning flag second counts are stored in the non-volatile memory of the EEPROM U1 (see FIG. 3). The warning flag second count values provide a lifetime register of the history of the particular rechargeable battery 50.

The sensor node main program, once a second, pauses and runs the sensor node one second interrupt program. When the sensor node one second interrupt program is completed, the sensor node main program continues execution at the interrupted program step.

Figure 9A:
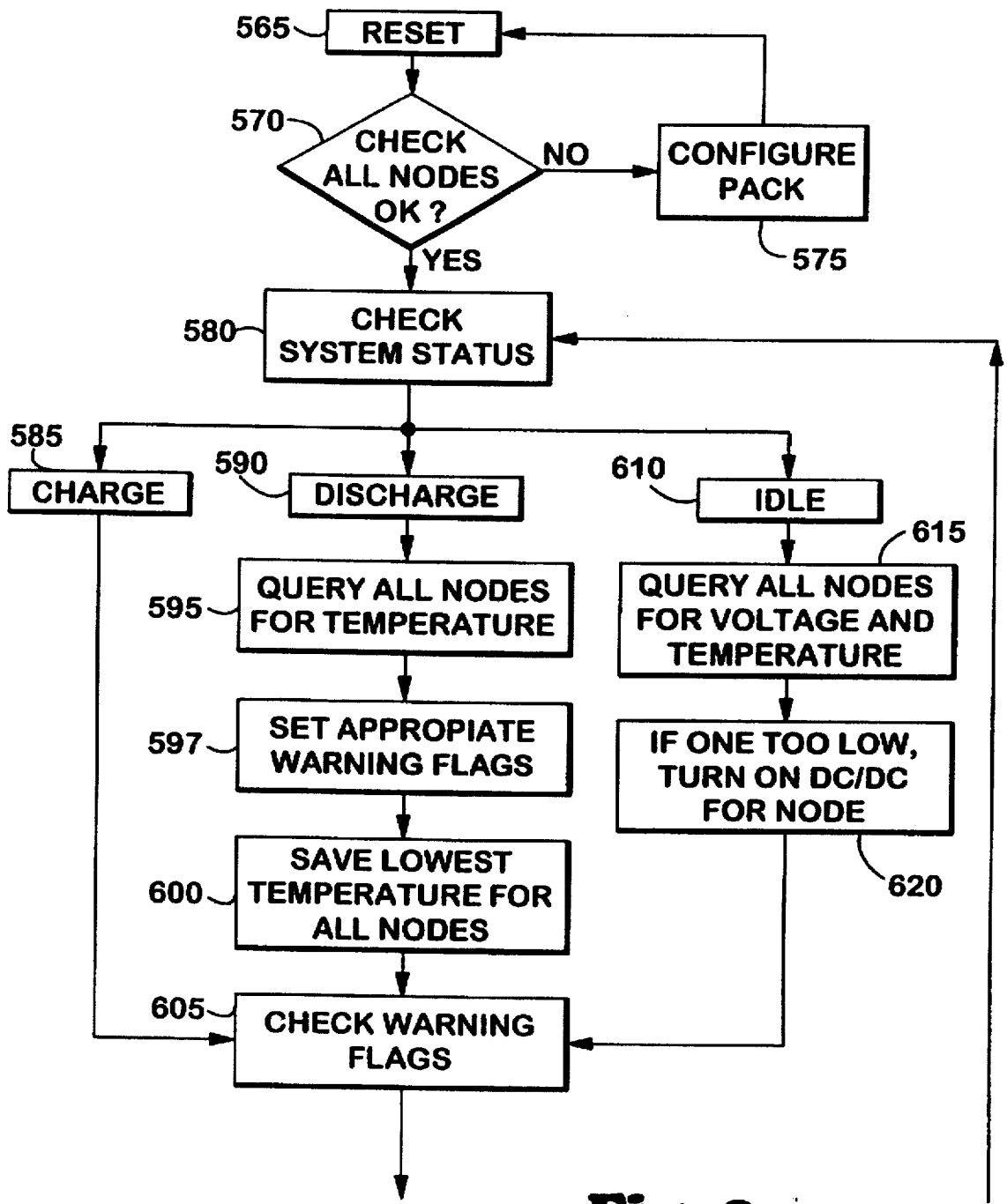
FIGS. 9a and 9b show a flow chart diagram of the main program for the battery management system.
Figure 9B:
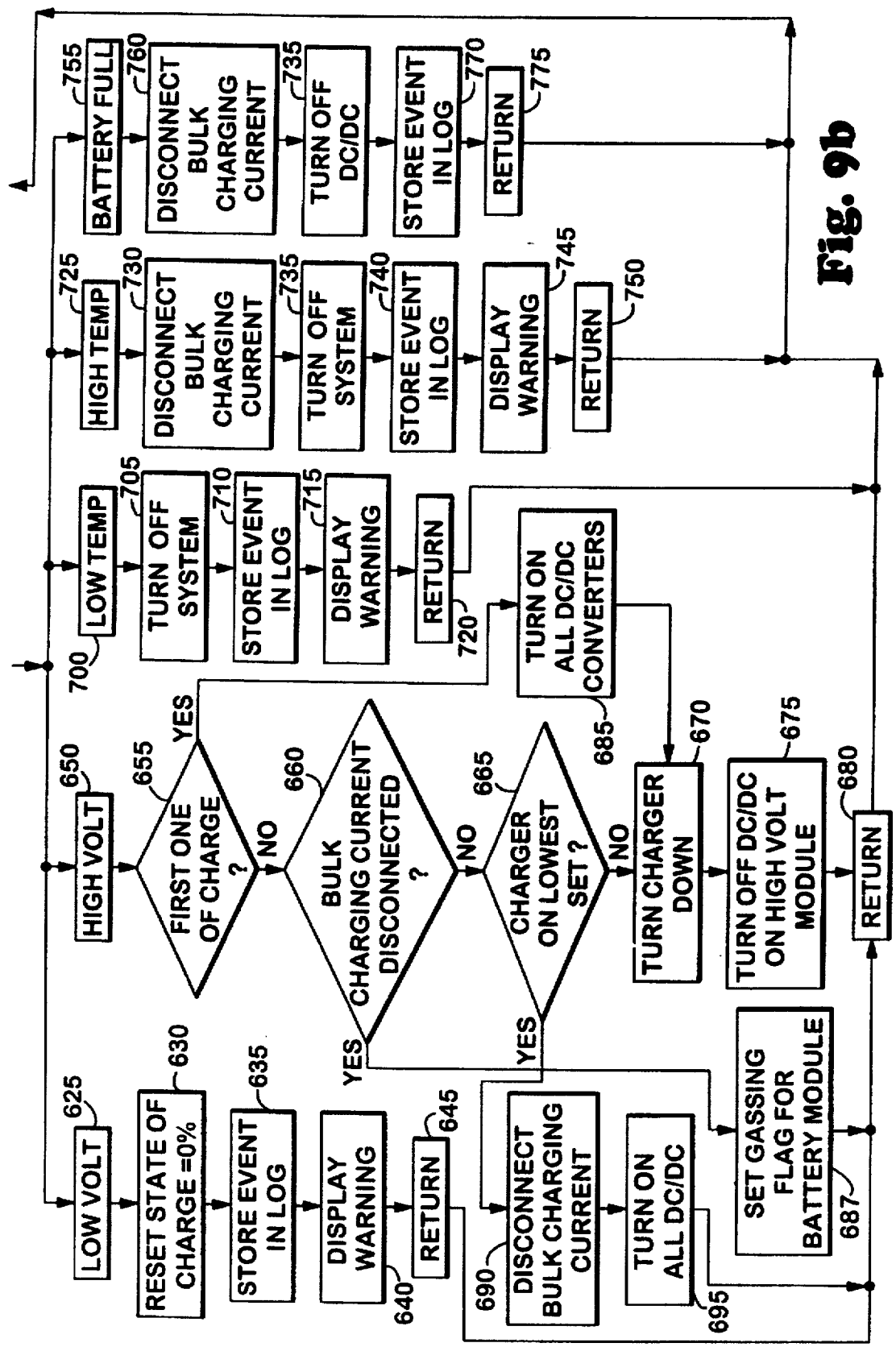

Referring to FIGS. 9a and 9b, the battery management system main program implemented by the CPU 20 will now be described.

After an initial reset of the CPU 20 in program step 565, the CPU 20 checks that all of the battery nodes 60 are working in program step 570.

If all of the battery nodes 60 are not working, then the CPU 20 configures the pack of battery modules 30 in program step 575. To configure the pack in step 575, the CPU 20 assigns addresses to and checks the working condition of the battery nodes 60. The detailed steps in configuring the battery nodes 60 is described in detail in the discussion of the serial communication and node serialization protocol of the battery management system 10.

If all of the battery nodes 60 are serialized and are working properly, the CPU 20 checks the overall system status in program step 580 and determines whether the system 10 is charging, discharging, or idle.

If the system 10 is discharging, the CPU 20 queries all of the sensor nodes 200 for battery operating temperatures in program step 595. The CPU 20 then sets appropriate warning flags in program step 597, and saves the lowest rechargeable battery operating temperature reading as the actual temperature of the pack of rechargeable batteries 50 in program step 600. In this manner, the CPU 20 is always conservative in determining the state of charge of the rechargeable batteries 50.

If the battery management system 10 is idle, all of the sensor nodes 200 are queried periodically for rechargeable battery terminal voltage and operating temperature in program step 615. If a rechargeable battery terminal voltage drops below a predetermined set point or the rechargeable battery operating temperature drops below a predetermined set point at a "full and ready" condition, then the DC/DC converter 210 for that particular rechargeable battery 50 is turned on by the CPU 20 in program step 620. This maintains the rechargeable batteries 50 in a battery pack at a relatively constant moderate temperature, so if one drops below a predetermined setpoint that one rechargeable battery 50 receives an overcharge so as to warm the rechargeable battery 50. This further maintains the rechargeable batteries 50 in a battery pack at approximately the same optimum terminal voltage in a "full and ready" condition.

In a preferred embodiment, the predetermined setpoint for the battery operating temperature at a "full and ready" condition is equal to the average operating temperature for the plurality of rechargeable batteries 50 within the battery pack minus a predetermined operating temperature differential. In a preferred embodiment, the predetermined operating temperature differential will range from about 2° to 10° C.

In a preferred embodiment, the predetermined setpoint for the battery terminal voltage at a "full and ready" condition is a predetermined acceptable lower terminal voltage at a "full and ready" condition. The CPU 20 activates the DC/DC converter 210 for a rechargeable battery 50 whose terminal voltage falls below the predetermined acceptable lower terminal voltage at a "full and ready" condition, continues monitoring the rechargeable battery terminal voltage, and turns the DC/DC converter 210 off once the rechargeable battery terminal voltage has reached an acceptable upper terminal voltage at a "full and ready" condition. In an exemplary embodiment, for typical rechargeable lead-acid batteries, the lower and upper acceptable voltages at a "full and ready" condition are approximately 12.6 volts and 14.25 volts respectively.

The CPU 20 next checks the warning flags. If there is a warning flag, a determination of which warning flag has been set is made in program step 605. There are five possibilities: 1) low battery voltage, 2) high battery voltage, 3) low battery operating temperature, 4) high battery operating temperature, or 5) battery full.

The first possibility, low voltage warning flag, which would typically occur while the system 10 is discharging, indicates that one of the rechargeable batteries 50 has exhausted its supply of energy and has dropped out of the pack. Such a low voltage flag will cause the CPU 20 to reset the state of charge to 0% for that rechargeable battery 50 in program step 630. The CPU 20 stores the event in a log in program step 635 so that there is a history of this event. The CPU 20 also displays a warning on the operator display 140 in program step 640, and returns in program step 645 to check the system status in program step 580.

The second possibility, high voltage warning flag, which would typically occur while the system 10 is charging, will cause the CPU 20 to determine whether it is the first such high voltage warning flag that has occurred during this charge in program step 655. If the high voltage warning flag set is not the first, then the CPU 20 determines whether the bulk charging current is disconnected from the rechargeable batteries 50 by operation of the switch 90 in program step 660. If the bulk charging current is not disconnected from the batteries 50, the CPU 20 determines whether the bulk charger 80 has been turned down to its lowest control setting in program step 665, where the control setting for the bulk charger 80 determines the level of charging current provided. If the bulk charger 80 has not been turned down to its lowest setting, then the CPU 20 adjusts the bulk charger 80 control setting downward in program step 670. The CPU 20 will then turn off the DC/DC converter 210 for the battery module 30 that generated the high voltage warning flag in program step 675. And finally, the CPU 20 will return in program step 680 to check the system status in program step 580. In a preferred embodiment, the bulk charger 80 control setting is adjusted downward by approximately one half when a high voltage warning flag is detected thereby reducing the bulk charging current by approximately one half.

If the high voltage warning flag is the first high voltage warning flag set during the charge, the CPU 20 turns on all of the DC/DC converters 210 in program step 685, adjusts the bulk charger 80 control setting downward in program step 670, turns off the DC/DC converter 210 for the battery module 30 that generated the high voltage warning flag in program step 675, and returns in program step 680 to check the system status in program step 580. When subsequent high voltage warning flags are generated while the bulk charging current is disconnected from the batteries 50, a gassing flag is set for the battery 50 whose battery module 30 generated the high voltage warning flag warning flag in program step 687.

If the bulk charger 80 is providing a bulk charging current to the batteries 50 at the lowest control setting when a high voltage warning flag is detected, then the bulk charging current is disconnected from the batteries 50 by operation of the switch 90 in program step 690 and every DC/DC converter 210 is turned on in program step 695.

The third possibility is a low battery operating temperature. If a low temperature warning flag is set, the bulk charging current is disconnected from the batteries 50 by operation of the switch 90 and all DC/DC converters 210 are turned off in program step 705. The event is stored in the log in program step 710 and a warning is then displayed to the operator on the display 140 in program step 715.

The fourth possibility is a high battery operating temperature. If a high temperature warning flag is set, then the bulk charging current is disconnected from the batteries 50 by operation of the switch 90 in program step 730. The DC/DC converter 210 is turned off for the battery module 30 that generated the high temperature warning flag in program step 735 and the event is stored in the log in program step 740. A warning is then displayed to the operator on the display 140 in program step 745.

The fifth possibility is a "full" battery. If a rechargeable battery 50 is "full", the CPU 20 disconnects the bulk charging current from the batteries 50 by operation of the switch 90 in program step 760. The CPU 20 then turns off the DC/DC converter 210 for the "full" battery 50 in program step 765, and stores the event in the log in program step 770.

The lowest control setting for the bulk charger 80 will determine a minimum bulk charging current level. In a preferred embodiment, the minimum bulk charging current level will be approximately equal to 1 to 2 percent of the 3-hour discharge capacity for the rechargeable batteries 50.

Figure 10:
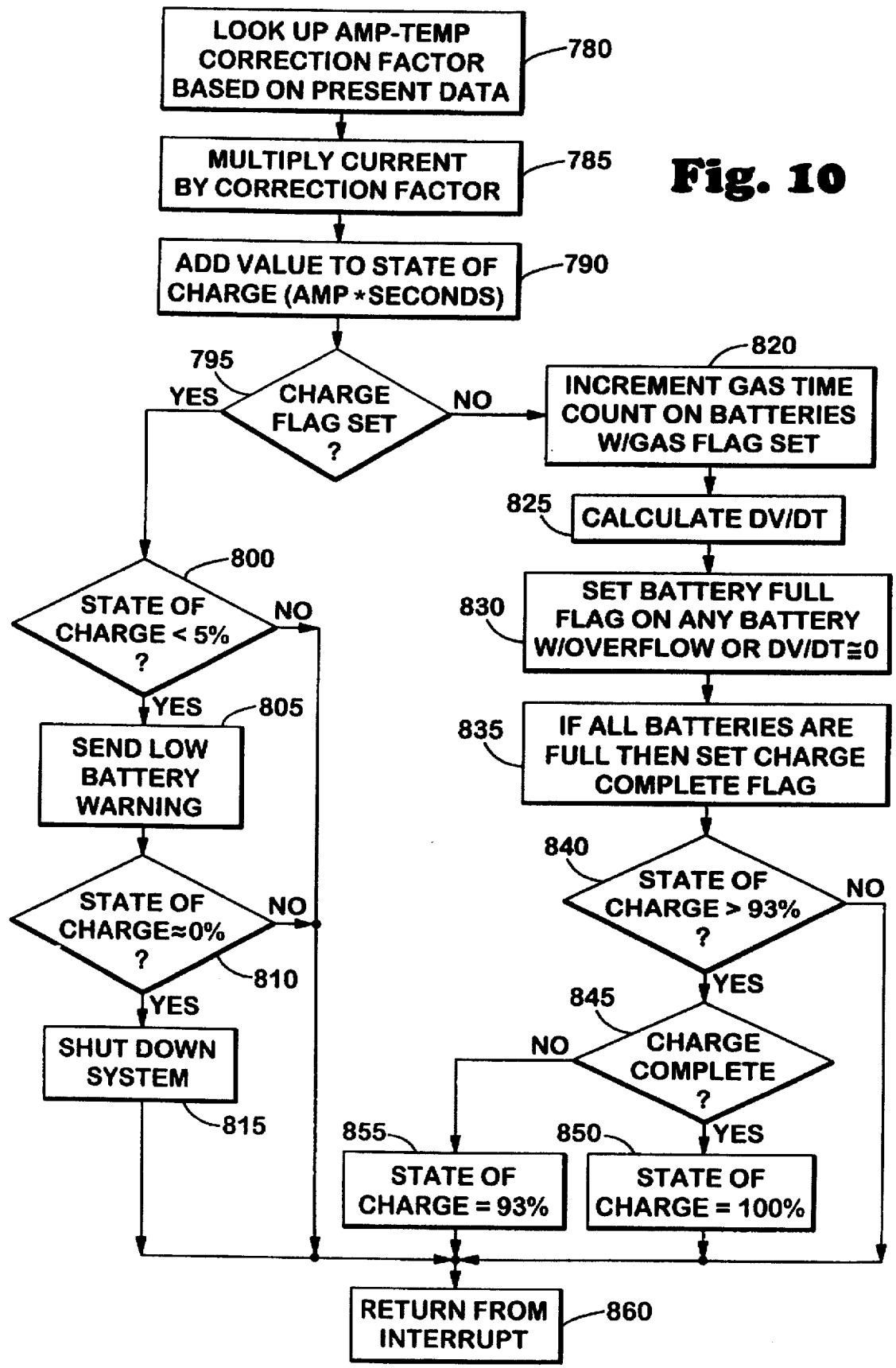
FIG. 10 shows a flow chart diagram of the battery management system one-second interrupt program.

Referring to FIG. 10, the battery management system one second interrupt program implemented by the CPU 20 will be described.

The battery management system one second interrupt determines the state of charge of the rechargeable batteries 50. Every second the battery management system one second interrupt is called by the battery management system main program.

In program step 780, the battery management system one second interrupt takes the current reading for charging current and temperature and looks up the amp-hour temperature compensated correction factor stored in memory.

The battery management system one second interrupt program multiplies the charging current by the correction factor to yield a corrected current value. This value is added to a state of charge register in program steps 785 and 790. A negative corrected current value indicates that the state of charge has become smaller, while a positive corrected current value indicates that the state of charge has become larger. Positive currents are charging currents, and negative currents are discharging currents. Thus, the calculated corrected charging current values are in amp-seconds. The battery management system one second interrupt program is called each second and the current is measured in amps.

The battery management system one second interrupt program determines whether the charge flag is set (i.e. whether the system 10 is charging or not) in program step 795.

If the system is not charging, and the state of charge for a battery 50 is less than about 5%, the CPU 20 sends a low battery warning flag for that battery 50 to the operator by means of the display 140 in program steps 800 and 805. The CPU 20 determines if the state of charge for a battery 50 is approximately zero % in program step 810. If the state of charge for a battery 50 is approximately zero %, then the CPU 20 shuts down the entire system in program step 815. If the state of charge for a battery 50 is greater than about 5% in program step 800, the CPU 20 returns from the battery management system one second interrupt program to the battery management system main program without a low battery warning flag being set for that battery 50. If the state of charge is greater than approximately zero % for a battery 50 in program step 810, the CPU 20 returns from the battery management system one second interrupt to the battery management system main program with a low battery warning flag set for that battery 50, but without shutting down the system.

If the charge flag is set, indicating that the rechargeable batteries 50 are being charged, then the battery management system one second interrupt program goes through a different set of program steps. The time counter for battery modules with the gassing flag set are incremented in program step 820. The CPU 20 calculates the dv/dt for the batteries 50 in program step 825. The function dv/dt is the magnitude of the rate of change of the terminal voltage for the rechargeable batteries 50.

The battery full flag is set in program step 830 for batteries 50 with an overflow condition or dv/dt approximately equal to zero. An overflow condition exists where the predetermined time limit for gassing has been exceeded for a battery 50. The time limit for gassing typically varies as a function of the particular battery type. In a preferred embodiment, a dv/dt in the range of about 0 mV/minute to 50 mV/minute will indicate a full battery 50.

If all of the batteries 50 are full, the charge complete flag is set in program step 835.

If the state of charge is greater than about 93%, the CPU 20 asks whether the charge has been completed in program steps 840 and 845. If the charge has been completed, the CPU 20 sets the state of charge to 100% and returns to the battery management system main program in program steps 850 and 860. If the charge has not been completed, the CPU 20 maintains the state of charge at 93% and does not allow the state of charge to go over 93% in program steps 845 and 855. The state of charge is maintained at 93% because there is an inherent uncertainty occurring between a charge of 93% and 100% for rechargeable batteries. It is well known in the art that this uncertainty makes it difficult to determine the state of charge for a battery between about 93% and 100%.

The rechargeable battery operating temperature typically ranges from about −30° C. up to 50° C. This range of values encompasses the operating range of values for typical lead-acid storage batteries.

The battery capacity algorithm for the battery management system one second interrupt uses a modified amp-hour counter which includes temperature and discharge rate compensation. The compensation accounts for battery inefficiencies which may occur when the temperature and discharge rate values exceed certain nominal values. In general, battery capacity decreases with low temperatures and high discharge rates. Conversely, battery capacity increases with high temperatures and low discharge rates. Accordingly, during a charging process, the capacity gage is held at about 93% until the battery management system has fully completed a charge cycle to allow for uncertainties in the state of charge between 93% and 100%. The amp-hour temperature correction factor is determined by a "characterization" of the battery 50 in a known manner.

In an exemplary embodiment, for a rechargeable lead-acid battery, the amp-hour temperature correction factors are indicated in Table 1:

TABLE 1

| Operating Temperature °C. | −30 | −20 | −10 | 0 | 10 | 20 | 30 | 40 |
|---|---|---|---|---|---|---|---|---|
| Charging Currents | 1.00 | 1.00 | 1.00 | 1.00 | 1.00 | 1.00 | 1.00 | 1.00 |

TABLE 1-continued

| Operating Temperature °C. | −30 | −20 | −10 | 0 | 10 | 20 | 30 | 40 |
|---|---|---|---|---|---|---|---|---|
| Discharging currents | | | | | | | | |
| C/3 | 1.82 | 1.61 | 1.52 | 1.32 | 1.11 | 1.05 | 1.00 | 1.01 |
| C/2 | 1.91 | 1.70 | 1.59 | 1.38 | 1.17 | 1.11 | 1.05 | 1.06 |
| C | 2.28 | 2.03 | 1.90 | 1.65 | 1.40 | 1.32 | 1.26 | 1.27 |
| 2C | 2.69 | 2.39 | 2.24 | 1.95 | 1.64 | 1.56 | 1.48 | 1.49 |
| 3C | 2.93 | 2.60 | 2.44 | 2.12 | 1.79 | 1.70 | 1.61 | 1.63 |
| 4C | 3.13 | 2.78 | 2.61 | 2.27 | 1.91 | 1.81 | 1.72 | 1.74 |
| 5C | 3.28 | 2.91 | 2.73 | 2.37 | 2.00 | 1.90 | 1.80 | 1.82 |

In Table 1, C indicates the three hour capacity of the battery in amp-hours and charging current indicates any current going back into the battery 50. For any charging current, the amp-hour correction factor will always equal 1.00. For discharging currents the amp-hour correction factor is determined in Table 1 by calculating the ratio of C to the discharging current level. For example, in an exemplary embodiment, for any charging current, at any given operating temperature, the amp-hour correction will be equal to 1.00. In another exemplary embodiment, for a discharging current of 45 amps, with C equal to 90 amp-hours, the discharging current in Table 1 will be equal to C/2 since the discharging current is one half of C. In such an exemplary embodiment, for an operating temperature of −10° C., the amp-hour correction factor will equal 1.59. For intermediate values of discharging currents and operating temperatures, the amp-hour correction factor is calculated by interpolating between the correction factors obtained by the initial "characterization" of the battery in a well known manner.

Referring to FIGS. 1, 2, 4, and 11, the serial communication and node serialization for the battery management system 10 will now be described.

Figure 11:
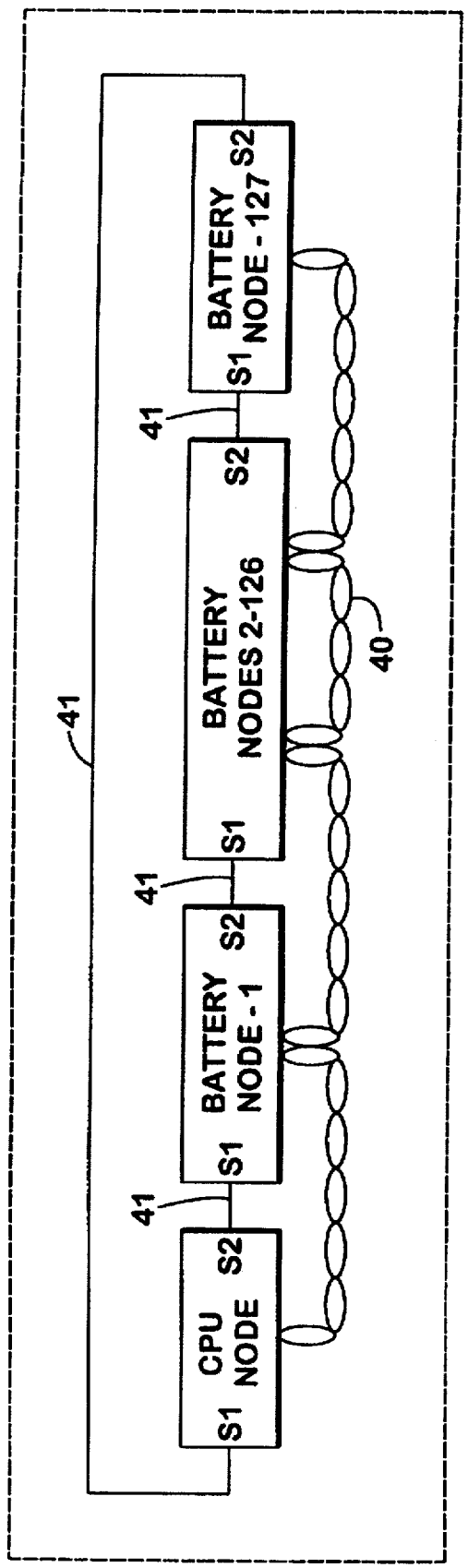
FIG. 11 is a schematic illustration of the signal port connections utilized in the battery management system.

Any number of industry standard serial communication protocols may be implemented in the system 10 to permit communication between the CPU 20 and the battery nodes 60 such as, for example, a Controller Area Network. In a preferred embodiment, the communication interface between the CPU 20 and the battery nodes 60 utilizes the industry standard RS-485 communications protocol. The communication interface is configured with the capacity for up to 128 battery nodes. The serial data bus 40 may be implemented as uninterrupted twisted pairs of conductors from a node at the CPU 20 to each of the battery nodes 60. The serial data bus 40 daisy-chains from the CPU node to each of the battery nodes 60 with no other connections as illustrated in FIG. 11. In a preferred embodiment, the serial data bus 40 includes two wires for the signals 485H and 485L (illustrated in FIG. 4).

FIG. 11 illustrates the signal port connection 41 to signal ports S1 and S2 located at each of the battery nodes 60 and at the CPU 20. The signal ports S1 and S2 at the battery nodes 60 provide the signals S1X and S2X in the line driver 205 (as illustrated in FIG. 4). As illustrated in FIGS. 1, 2, and 11, the S1 and S2 signal ports of the battery nodes 60 are connected in series with the S1 signal port of one battery node 60 connected to the S2 signal port of the following battery node 60. The S1 signal port at the CPU 20 is connected to the S2 signal port of a first one of the battery nodes 60 and the S2 signal port at the CPU is connected to the S1 signal port of a last one of the battery nodes 60.

In a preferred embodiment, the battery management system 10 communicates with an inquiry/response sequence. The CPU 20 node initiates every message exchange by sending a message addressed to a specific battery node 60 and that battery node 60 then responds to the CPU node. The CPU node also may broadcast messages to all battery nodes 60 simultaneously. When more than one battery node 60 responds to a broadcast message, the CPU node will encounter a communication error and the CPU node will employ signaling in addition to sending broadcast messages to identify the battery nodes 60 involved in the communications exchange. Since the serial dam bus 40 is a half-duplex communication path, only one node (i.e. CPU 20 and battery nodes 60) transmits on the serial data bus 40 at any time. When one node is transmitting, all other nodes must have their transmit drivers tri-stated (i.e., turned off).

The nodes not transmitting, receive the data being transmitted. These nodes recognize messages addressed to them and messages broadcast to all nodes. Each time a node completes transmission on the serial data bus 40 it tri-states (i.e. turns off) its transmit drivers.

In a preferred embodiment, broadcast messages in the battery management system 10 conform to the following format:

| Byte 1 | Byte 2 | Byte 3 | Byte 4 | {Byte} | {Byte} | {Byte} | Last Byte |
|---|---|---|---|---|---|---|---|
| To-node | From-node | Length | Msg-ID | {Param-1} | {Param-2} | {Param-3} | V.R.C. |

Messages are addressed to specific nodes (Byte #1) by the sending node (Byte #2) and specify the length (Byte #3) of the remainder of the message (Message ID and Parameter Data). The last Byte of the message is a VRC byte that is calculated for the preceding bytes in the message. VRC refers to the industry standard term Vertical Redundancy Check byte which is generated upon transmission, transmitted with the message, generated upon reception, and checked with the transmitted version to verify that the message received is the same as the message sent.

The VRC byte is generated/verified by the following procedure:

```
SET VRC = 0
FOR (each message byte)
    XOR message byte to VRC
    Rotate Left (VRC) 1 bit
    advance to next message byte
END FOR
```

In a preferred embodiment, the RS485 messages are transmitted using the following parameters:
Baud Rate=9600
Start Bits=1
Data Bits=8
Parity bit=Odd
Stop Bits=1

In a preferred embodiment, message timing is implemented using the following parameters:
Maximum Time allowed to Disable (tri-state) Transmit drivers after completion of stop bit=1 Bit Time.
Minimum Wait Time for Reply node before sending Start Bit (after stop bit is received)=2 Bit times.
Maximum interval between Message Bytes=2 Character Times.
Maximum response timeout value (end of stop bit to response start bit)=10 milliseconds.

In an exemplary embodiment, node addresses are byte values of 1 thru 255. In a preferred embodiment, the byte value of zero is used to indicate a broadcast address rather than a specific node ID. For a typical application, the range of byte values that are assigned to battery nodes 60 as their node IDs are the values of 1 thru 127. The CPU 20 node uses the byte value of 128 as its node ID. In a preferred embodiment, node IDs are assigned starting with a byte value of 1 as the battery node 60 with its signal port 1 (S1) connected to signal port 2 (S2) of the CPU 20 node. Node ID 2 is assigned to the battery node 60 with its signal port 1 (S1) connected to signal port 2 (S2) of the battery node 60 with node ID 1, etc. The last battery node 60 has its signal port 2 (S2) connected to signal port 1 (S1) of the CPU 20 node (node ID 128). The CPU 20 node may assign a new node ID to a battery node 60 while it is going through a configuring process to establish sequential node IDs among the battery nodes 60 and in the order of their connection by the signal port connecting lines. This process may assign node ID values between 129 and 255 as a temporary measure to free up the previously existing node ID value for use by a different node.

In a preferred embodiment, the serial communication within the battery management system 10 includes broadcast address messages, node address messages, and node reply messages (note that CPU refers to the node at the CPU 20).

Broadcast address messages for the battery management system 10 include:

| LD | NAME | FROM | TO | DESCRIPTION |
|---|---|---|---|---|
| 01h | SETNODE-ID | CPU | all battery nodes | Assign new node ID if (S1 & S2 are both Inactive) |
| 09h | SIGNAL-0 | CPU | all battery nodes | De-activate and Stop Signal monitoring on (S1 and S2) |
| 0Ah | SIGNAL-1 | CPU | all battery nodes | De-activate Signal Port 1 (S1) |
| 0Bh | SIGNAL-2 | CPU | all battery nodes | De-activate Signal Port 2 (S2) |
| 0Ch | SIGNAL-3 | CPU | all battery nodes | Activate Signal Port 1 (S1) |
| 0Dh | SIGNAL-4 | CPU | all battery nodes | Activate Signal Port 2 (S2) |
| 0Eh | SIGNAL-5 | CPU | all battery nodes | Activate signal Port 1 (S1) if Signal Port 2 (S2) is active |
| 0Fh | SIGNAL-6 | CPU | all battery nodes | Activate signal Port 2 (S2) if Signal Port 1 (S1) is active |
| 10h | CONFIG-1 | CPU | all battery nodes | Signal (S2) if Battery Serial Number VRC Matches |
| 11h | CONFIG-2 | CPU | all battery nodes | Signal (S2) if Battery Serial Number Checksum Matches |
| 12h | CONFIG-3 | CPU | all battery nodes | Signal (S2) if Battery Serial Number VRC & Checksum match |
| 13h | QUERY-1 | CPU | all battery nodes | ACK if Neither Signal Port (S1 nor S2) is active |
| 14h | QUERY-2 | CPU | all battery nodes | ACK if Either Signal Port (S1 or S2) is active |
| 15h | QUERY-3 | CPU | all battery nodes | ACK if Both Signal Ports (S1 and S2) are active |

Node address messages for the battery management system 10 include:

| ID | NAME | FROM | TO | DESCRIPTION |
|---|---|---|---|---|
| 00h | REPEAT-LAST | CPU | battery node | Repeat your Reply |
| 01h | SETNODE-ID | CPU | all battery nodes | Assign new node ID if (S1 & S2 are both Inactive) |
| 02h | SETNODE-ID | CPU | battery node | Assign and respond to new node ID |
| 03h | ARE-U-THERE | CPU | battery node | Send ACK if the node recognizes this message |
| 04h | DC-DC-CNTRL | CPU | battery node | Turn (ON/OFF) DC-DC Converter |
| 05h | GET-A-D | CPU | battery node | Measure Voltage and temp with A/D and return Values |
| 06h | GET-EEPROM | CPU | battery node | Read 2 bytes of EEPROM data and return Values |
| 07h | PUT-EEBYTE | CPU | battery node | Write 1 byte of EEPROM data at specified address |
| 08h | PUT-EEWORD | CPU | battery node | Write 2 bytes of EEPROM data at specified address |
| 09h | SIGNAL-0 | CPU | battery node | De-activate and Stop Signal monitoring on (S1 and S2) |
| 0Ah | SIGNAL-1 | CPU | battery node | De-activate Signal Port 1 (S1) |
| 0Bh | SIGNAL-2 | CPU | battery node | De-activate Signal Port 2 (S2) |
| 0Ch | SIGNAL-3 | CPU | battery node | Activate Signal Port 1 (S1) |
| 0Dh | SIGNAL-4 | CPU | battery node | Activate Signal Port 2 (S2) |
| 0Eh | SIGNAL-5 | CPU | battery node | Activate signal Port 1 (S1) if Signal Port 2 (S2) is active |
| 0Fh | SIGNAL-6 | CPU | battery node | Activate signal Port 2 (S2) if Signal Port 1 (S1) is active |
| 10h | CONFIG-1 | CPU | battery node | Signal if Battery Serial Number VRC Matches |
| 11h | CONFIG-2 | CPU | battery node | Signal if Battery Serial Number Checksum Matches |
| 12h | CONFIG-3 | CPU | battery node | Signal if Battery Serial Number VRC & Checksum match |
| 13h | QUERY-1 | CPU | battery node | Respond if Neither Signal Port (S1 and S2) is active |
| 14h | QUERY-2 | CPU | battery node | Respond if Both Signal Ports (S1 and S2) are active |
| 15h | QUERY-3 | CPU | battery node | Respond if Either Signal Port (S1 or S2) is active |

Node reply messages for the battery management system 10 include:

| ID | NAME | FROM | TO | DESCRIPTION |
|---|---|---|---|---|
| 00h | ACK | battery node | CPU | Acknowledge to message received |
| 01h | NACK | battery node | CPU | Acknowledge to message received |
| 02h | AD-REPORT | battery node | CPU | Report Temperature and Voltage A/D measurements |
| 03h | EEPROM-DAT | battery node | CPU | Report 2 bytes at EEPROM address requested |
| 04h | SIGNAL-STAT | battery node | CPU | Status of Signal Ports 1 and 2 (S1 and S2) |

A number of different message formats may be used to provide communications between and serialization of the CPU 20 and battery nodes 60 of the battery management system 10. In a preferred embodiment, the following message formats are utilized in the serial communication and node serialization for the battery management system 10:

SIGNAL-0 Message to specific battery node 60 or to all battery nodes to cancel all action initiated by SIGNAL-3 thru SIGNAL-6 and/or CONFIG-1 thru CONFIG-3.

| Byte 1 | Byte 2 | Byte 3 | Byte 4 | Byte 5 |
|---|---|---|---|---|
| To Node ID | From ID 80h | Length 1 | Message ID 09h | VRC |

SIGNAL-1 Message to specific battery node 60 or to all battery nodes to de-activate signal port 1 (S1).

| Byte 1 | Byte 2 | Byte 3 | Byte 4 | Byte 5 |
|---|---|---|---|---|
| To Node ID | From ID 80h | Length 1 | Message ID 0Ah | VRC |

SIGNAL-2 Message to specific battery node 60 or to all battery nodes to de-activate signal port 2 (S2).

| Byte 1 | Byte 2 | Byte 3 | Byte 4 | Byte 5 |
|---|---|---|---|---|
| To Node ID | From ID 80h | Length 1 | Message ID 0Bh | VRC |

SIGNAL-3 Message to specific battery node 60 or to all battery nodes to activate signal port 1 (S1).

| Byte 1 | Byte 2 | Byte 3 | Byte 4 | Byte 5 |
|---|---|---|---|---|
| To Node ID | From ID 80h | Length 1 | Message ID 0Ch | VRC |

SIGNAL-4 Message to specific battery node 60 or to all battery nodes to activate signal port 2 (S2).

| Byte 1 | Byte 2 | Byte 3 | Byte 4 | Byte 5 |
|---|---|---|---|---|
| To Node ID | From ID 80h | Length 1 | Message ID 0Dh | VRC |

SIGNAL-5 Message to specific battery node 60 or to all battery nodes to repeat signal port 2 (S2) on signal port 1 (S1).

| Byte 1 | Byte 2 | Byte 3 | Byte 4 | Byte 5 |
|---|---|---|---|---|
| To Node ID | From ID 80h | Length 1 | Message ID 0Eh | VRC |

SIGNAL-6 Message to specific battery node 60 or to all battery nodes to repeat signal port 1 (S1) on signal port 2 (S2).

| Byte 1 | Byte 2 | Byte 3 | Byte 4 | Byte 5 |
|---|---|---|---|---|
| To Node ID | From ID 80h | Length 1 | Message ID 0Fh | VRC |

CONFIG-1 Message to specific battery node 60 or to all battery nodes to assert signal port 2 if the VRC for the node's battery serial number matches Byte 5 of the message.

| Byte 1 | Byte 2 | Byte 3 | Byte 4 | Byte 5 | Byte 6 |
|---|---|---|---|---|---|
| To Node ID | From ID 80 h | Length 2 | Message ID 10 h | Serial Num. VRC | VRC |

CONFIG-2 Message to specific battery node 60 or to all battery nodes to assert signal port 2 if the checksum for the node's battery serial number matches Byte 5 of the message.

| Byte 1 | Byte 2 | Byte 3 | Byte 4 | Byte 5 | Byte 6 |
|---|---|---|---|---|---|
| To Node ID | From ID 80 h | Length 2 | Message ID 11 h | Serial Num. Checksum | VRC |

CONFIG-3 Message to specific battery node 60 or to all battery nodes to assert signal port 2 if the VRC and the checksum for the node's battery serial number matches Bytes 5 and 6 of the message.

| Byte 1 | Byte 2 | Byte 3 | Byte 4 | Byte 5 | Byte 6 | Byte 7 |
|---|---|---|---|---|---|---|
| To Node ID | From ID 80 h | Length 3 | Message ID 12 h | Serial Num. VRC | Serial Num. Checksum | VRC |

QUERY-1 Message to specific battery node 60 or to all battery nodes to respond by sending message SIGNAL-STAT if neither signal port (S1 and S2) input is active.

| Byte 1 | Byte 2 | Byte 3 | Byte 4 | Byte 5 |
|---|---|---|---|---|
| To Node ID | From ID 80 h | Length 1 | Message ID 13 h | VRC |

QUERY-2 Message to specific battery node 60 or to all battery nodes to respond by sending message SIGNAL-STAT if both signal port (S1 and S2) inputs are active.

| Byte 1 | Byte 2 | Byte 3 | Byte 4 | Byte 5 |
|---|---|---|---|---|
| To Node ID | From ID 80 h | Length 1 | Message ID 14 h | VRC |

QUERY-3 Message to specific battery node 60 or to all battery nodes to respond with the message SIGNAL-STAT if either signal port (S1 and S2) input is asserted.

| Byte 1 | Byte 2 | Byte 3 | Byte 4 | Byte 5 |
|---|---|---|---|---|
| To Node ID | From ID 80 h | Length 1 | Message ID 15 h | VRC |

SETNODE-ID Message to specific battery node 60 to hereafter respond only to the new node ID. The addressed node is expected to send an ACK reply using the former node ID. When this message is broadcast, the node(s) having neither S1 nor S2 active take this action, and all nodes with either S1 or S2 or both S1 and S2 active ignore it.

| Byte 1 | Byte 2 | Byte 3 | Byte 4 | Byte 5 | Byte 6 |
|---|---|---|---|---|---|
| To Node ID | From ID 80 h | Length 2 | Message ID 01 h/02 h | New Node ID | VRC |

ARE-U-THERE Message to specific battery node 60 to send an ACK reply if this message is recognized.

| Byte 1 | Byte 2 | Byte 3 | Byte 4 | Byte 5 |
|---|---|---|---|---|
| To Node ID | From ID 80 h | Length 1 | Message ID 03 h | VRC |

DC-DC-CNTRL Message to specific battery node 60 to turn (ON/OFF) its DC-DC converter 210 and respond with either ACK or NACK as appropriate.

| Byte 1 | Byte 2 | Byte 3 | Byte 4 | Byte 5 | Byte 6 |
|---|---|---|---|---|---|
| To Node ID | From ID 80 h | Length 2 | Message ID 04 h | 0 = OFF 1 = ON | VRC |

GET-A-D Message to specific battery node 60 to measure temperature and voltage of its battery and to then reply with an AD-REPORT or a NACK message.

| Byte 1 | Byte 2 | Byte 3 | Byte 4 | Byte 5 |
|---|---|---|---|---|
| To Node ID | From ID 80 h | Length 1 | Message ID 05 h | VRC |

AD-REPORT Response message from a battery node 60 to the CPU 20 node after a GET-A-D message. New A/D measurements for both temperature and voltage are made before responding.

| Byte 1 | Byte 2 | Byte 3 | Byte 4 | Byte 5 | Byte 6 | Byte 7 |
|---|---|---|---|---|---|---|
| To CPU 80 h | From Node ID | Length 3 | Message ID 02 h | Battery Temp (A/D) | Battery Volts (A/D) | VRC |

GET-EEPROM Message to specific battery node 60 or read the word of EEPROM U1 specified by Byte 5 and Reply with an EEPROM-DAT message.

| Byte 1 | Byte 2 | Byte 3 | Byte 4 | Byte 5 | Byte 6 |
|---|---|---|---|---|---|
| To Node ID | From ID 80 h | Length 2 | Message ID 06 h | EEPROM Address | VRC |

EEPROM-DAT Response message from a battery node 60 to the CPU 20 node after a GET-EEPROM message. EEPROM U1 Address is that for a word (even value).

| Byte 1 | Byte 2 | Byte 3 | Byte 4 | Byte 5 | Byte 6 | Byte 7 | Byte 8 |
|---|---|---|---|---|---|---|---|
| To CPU 80h | From Node ID | Length 4 | Message ID 03h | EEPROM Address | Low Adr. Data Byte | High Adr. Data Byte | VRC |

PUT-EEBYTE Message to specific battery node 20 to write the Byte of EEPROM U1 specified by Bytes 5 and 6 and to Reply with an ACK or NACK message.

| Byte 1 | Byte 2 | Byte 3 | Byte 4 | Byte 5 | Byte 6 | Byte 7 |
|---|---|---|---|---|---|---|
| To Node ID | From ID 80h | Length 3 | Message ID 07h | EEPROM Address | Data Byte | VRC |

PUT-EEWORD Message to specific battery node 60 to write the word of EEPROM U1 specified by Bytes 5, 6, and 7 and to reply with an ACK or NACK message.

| Byte 1 | Byte 2 | Byte 3 | Byte 4 | Byte 5 | Byte 6 | Byte 7 | Byte 8 |
|---|---|---|---|---|---|---|---|
| To Node ID | From ID 80h | Length 4 | Message ID 08h | EEPROM Address | Low Adr. Data Byte | High Adr. Data Byte | VRC |

REPEAT-LAST Message to specific battery node 60 to repeat the last former response message.

| Byte 1 | Byte 2 | Byte 3 | Byte 4 | Byte 5 |
|---|---|---|---|---|
| To Node ID | From ID 80h | Length 1 | Message ID 00h | VRC |

ACK Response message from a battery node 60 to the CPU 20 node that the last request action was completed or that no error has occurred.

| Byte 1 | Byte 2 | Byte 3 | Byte 4 | Byte 5 |
|---|---|---|---|---|
| To CPU 80h | From Node ID | Length 1 | Message ID 00h | VRC |

NACK Response message from a battery node 60 to the CPU 20 node that the last request action was not completed or that an error has occurred.

| Byte 1 | Byte 2 | Byte 3 | Byte 4 | Byte 5 |
|---|---|---|---|---|
| To CPU 80h | From Node ID | Length 1 | Message ID 01h | VRC |

SIGNAL-STAT 0 Response Message from a battery node 60 to the CPU 20 node following a Query-1, Query-2, or a Query-3 message indicating the defined condition exists at this node.

| Byte 1 | Byte 2 | Byte 3 | Byte 4 | Byte 5 | Byte 6 | Byte 7 |
|---|---|---|---|---|---|---|
| To CPU 80h | From Node ID | Length 3 | Message ID 04h | S1-in=x1 S1-out=1x | S2-in=x2 S2-Out=2x | VRC |

Operation of the serial communications of the battery management system 10 depends upon the CPU 20 node having the ability to maintain an exchange of information with each of the battery nodes 60 continuously while the batteries 50 are electrically connected in series and while there is a connection of the serial data bus 40 to all of the battery nodes 60 and to the CPU 20 node. FIG. 11 illustrates the configuration that exists during this period. Any battery node 60 that has its serial data interface 40 open or shorted with respect to the serial data bus 40 will not be capable of having its charging or discharging periods monitored by the CPU 20, hence that battery 50 will be vulnerable to over or under charge until the problem is corrected.

When the battery modules 30 with their respective battery nodes 60 are first assembled with the CPU 20 node, the node addresses of each battery node 60 must be established. The CPU 20 node has no way of knowing that node ID values may already exist in each of the battery nodes 60. It is very likely that more than one of the node IDs within the battery pack are identical. It is also very likely that the node ID values are not in the preferred order that is depicted in FIG. 11.

Assuming that every battery node 60 is connected to the serial data bus 40, the CPU 20 node can communicate with every battery node 60 with broadcast messages that cause the battery nodes 60 to monitor and control their signal ports.

The node address configuring process may be implemented in a number of ways provided that all of the system nodes are completely identified each with a unique and preferably sequential identifier. In a preferred embodiment, the address configuring process begins with the CPU 20 node activating its signal port 2 (S2) and follows up by broadcasting a SIGNAL-6 message to all of the battery nodes 60. Referring to FIG. 11, battery node-1 will detect its signal port 1 (S1) active and will then activate its signal port 2 (S2). Battery node-2 will do the same thing and so will each of the other Battery nodes 60 until the last battery node 60 in the series has activated its signal port 2 (S2) which will then be detectable by the CPU 20 node. The CPU 20 node can then be sure that none of the signal port connections between battery nodes 60 are open. It is still possible that a connection to signal port 1 of some battery Node 60 is shorted to signal port 2 of the same node, effectively bypassing that node. To eliminate this latter possibility, the CPU 20 node must de-activate its signal port 2 (S2) output and broadcast SIGNAL-0, QUERY-2, and SIGNAL-6. Every node whose signal port 1 becomes active will first check its signal port 2 to determine if it is active before the node activates its signal port 2. If a node detects that both of its signal ports become active at the same time the node will send a SIGNAL-STAT message to so inform the CPU 20 node.

The CPU 20 node will de-assert its signal port 2 and broadcast SIGNAL-0, SIGNAL-4, and SET-NODE=01. This sequence will reach battery node-1 in FIG. 11 and set its node ID=1. The CPU 20 node will next send SIGNAL-0 to Node-ID 1, causing it to de-assert its signal port 2. The node at the CPU 20 will assert its signal port 2 then broadcast SET-NODE= 02. This last sequence will reach battery Node-2 in FIG. 11 and set its Node ID=2. Continuing this process permits each successive battery node 60 to be assigned a node ID that is in agreement with FIG. 11. Since this signaling process may also be done using signal port 1 of the CPU node, it is possible to reach every battery node 60 by this method even if one of the wires between battery node signal ports is disconnected. The possibility of both signal ports on a battery node 60 being open can be circumvented by employing QUERY-1, QUERY-2, and QUERY-3 messages and/or CONFIG-1, CONFIG-2, and CONFIG-3 messages. The last three messages require that the CPU 20 node try up to 254 ID VRC and/or checksum values in order to reach the isolated battery node 60.

The checksum, as is well known, is a byte which is generated by adding all of the bytes in a block, with no overflow, which truncates the result to one byte. This is used in addition to the VRC for verification purposes.

When all of the battery nodes 60 have been addressed and their node IDs set to be sequential, the CPU 20 node needs to obtain a current record of the EEPROM U1 data from each battery node 60 in order to keep it current and send PUT-EEBYTE or PUT-EEWORD messages when changes need to be written back into the EEPROM U1 of any battery node 60.

As long as all connections are maintained and no battery node 60 fails, it will not be necessary to reconfigure the battery node IDs. If a connection comes loose, or a battery node 60 quits operating, then a configuration pass will be attempted again and a warning flag set and displayed to the operator.

During operation of the system 10, the management and control of the plurality of battery modules 30 is performed in three basic phases.

During phase one, the CPU 20 preferably provides approximately 93% charge by means of the bulk charger 80. The CPU 20 generates a bulk charger control signal 160 commanding the bulk charger 80 to provide full bulk charging current. For a typical bulk charger, the bulk charging current will range from about 1 to 50 amps.

Throughout phase one of the charging process, the battery modules 30 provide a plurality of rechargeable battery terminal voltage signals and rechargeable battery operating temperature signals representative of the corresponding rechargeable battery terminal voltage and rechargeable battery operating temperature to the CPU 20. When the CPU 20 receives the first battery terminal voltage signal indicating that a rechargeable battery 50 has a terminal voltage greater than the predetermined clamping voltage $V_{clamp}$, the CPU 20 generates a bulk charger control signal 160 commanding the bulk charger 80 to reduce the bulk charging current, all of the DC/DC converters 210 for the rechargeable batteries 50 are activated, and then the DC/DC converter 210 for the rechargeable battery 50 having a terminal voltage exceeding the predetermined clamping voltage $V_{clamp}$ is turned off. The DC/DC converters that remain on provide an average charging current of approximately 1 percent of the 3-hour discharge capacity of the rechargeable batteries 50.

In a preferred embodiment the CPU 20 generates a bulk charger control signal 160 commanding the bulk charger 80 to reduce the bulk charging current to approximately one half of its previous value. The reduction in the bulk charging current by approximately one half provides a gradual decrease in the charging current. Other gradients may be utilized as well, such as, for example, exponential or equal stepwise decreases in bulk charging current. For typical rechargeable lead-acid batteries, the clamping voltage $V_{clamp}$ will typically be around about 14 to 15 volts. In an exemplary embodiment, the clamping voltage $V_{clamp}$ will be approximately 14.25 volts @ 80° F. This process of continuous detection of battery terminal voltage, reduction in bulk charging current, and provision of separate charging currents to the remaining rechargeable batteries 50 whose terminal voltages have not yet exceeded the clamping voltage $V_{clamp}$ continues until the bulk charging current has reached a predetermined lower bulk charging current limit. At that point typically all of the DC/DC converters 210 will be turned off. In an exemplary embodiment, the predetermined lower bulk charging current limit is approximately 1 amp.

In a preferred embodiment, the predetermined lower bulk charging current limit is approximately equal to 1 to 2 percent of the 3-hour discharge rating of the batteries 50. Thus, for example, if the each of the batteries 50 has a 3-hour discharge rating of 100 amp-hours then the lower bulk charging current limit ranges from approximately 1 to 2 amps. Once the predetermined lower bulk charging current limit has been reached, phase two of the charging process begins.

During phase two of the charging process, the plurality of battery modules 30 complete the charging process for the plurality of rechargeable batteries 50 on an individual basis by means of the DC/DC converters 210. The CPU 20 first disconnects the bulk charger 80 from the plurality of battery modules 30 by generating a trim charge control signal 170 which places the control switch 90 in a position interrupting the flow of the bulk charging current to the batteries 50. All of the DC/DC converters 210 are then turned on by means of the plurality of sensor nodes 200, which are in turn controlled by the CPU 20 by means of the serial interface 40. The DC/DC converters 210 provide a average charging current of approximately 1 percent of the 3-hour discharge rating of the battery 50. In an exemplary embodiment, for batteries 50 having 3-hour discharge ratings of 100 amp-hours, the DC/DC converters 210 will each provide an average charging current of 1±0.25 amps to the rechargeable batteries 50. Throughout phase two of the charging process, the battery modules 30 provide rechargeable battery voltage signals and rechargeable battery temperature signals representative of the corresponding battery terminal voltage and battery operating temperature to the CPU 20. If the CPU 20 detects a rate of change of battery terminal voltage, dv/dt, below a predetermined lower dv/dt limit (which indicates a "full battery") then the DC/DC converter 210 for that particular battery module 30 is turned off. The predetermined lower dv/dt limit indicating a fully charged condition for the rechargeable battery 50. In a preferred embodiment, a dv/dt less than or equal to about 50 mV/minute indicates a "full" battery for typical lead-acid rechargeable batteries. If one or more of the rechargeable batteries 50 fail to reach full charge within a predetermined full charging time limit, an error flag is set within the CPU 20, and all of the DC/DC converters 210 are turned off. Once all of the batteries 50 have become fully charged phase three of the charging process is entered.

During phase three of the charging process, the CPU 20 maintains the plurality of rechargeable batteries 50 at a "full and ready" condition. Throughout phase three of the charging process, the battery modules 30 provide rechargeable battery terminal voltage signals and rechargeable battery operating temperature signals representative of their corresponding rechargeable battery terminal voltages and rechargeable battery operating temperatures to the CPU 20. If the CPU 20 detects a rechargeable battery 50 whose operating temperature is less than the average temperature of the plurality of rechargeable batteries 50 by a predetermined temperature differential, the CPU 20 activates the DC/DC converter 210 for that rechargeable battery 50 to supply charging current to the rechargeable battery 50. The excess charging current supplied to that rechargeable battery 50 heats the rechargeable battery 50 as recombination takes place within the cells of the rechargeable battery 50. In this manner, the CPU 20 is able to even out temperatures among the plurality of rechargeable batteries 50 by providing individual warming of rechargeable batteries 50 through selective activation of the DC/DC converters 210. In a preferred embodiment, the predetermined temperature differential ranges from about 2° C. to 10° C.

The CPU 20 further turns on the DC/DC converter 210 whenever the terminal voltage of a particular rechargeable battery 50 falls below a predetermined acceptable lower voltage in a "full and ready" condition. The CPU 20 continues monitoring and turns the DC/DC converter 210 off once the rechargeable battery terminal voltage has reached a predetermined acceptable upper voltage during a "full and ready" condition. In an exemplary embodiment, for typical lead-acid rechargeable batteries, the lower voltage and upper voltage are approximately 12.6 volts and 14.25 volts respectively (both temperature compensated).

Thus, during operation of the battery management system 10, the CPU 20 handles the high level algorithmic functions, the operator interface, the vehicle interface, and the bulk charger control functions, while the sensor nodes 200 provide monitoring of the plurality of rechargeable batteries 50. The serial interface 40 further enables the CPU 20 to communicate with the individual sensor nodes 200 located at the individual battery modules 30. The sensor nodes 200 measure the voltage and temperature of the rechargeable batteries 50 to which they are connected, and also control the DC/DC converters 210 located at each of the battery modules 30. The DC/DC converters 210 in turn provide 500 VDC isolation between the rechargeable battery voltage, and the 2 wire low voltage power bus 130 (9–16 V) which is common to each of the DC/DC converters 210 as well as the CPU 20. The DC/DC converters 210 provide current to the individual rechargeable batteries 50 on command from the CPU 20 by means of the sensor nodes 200 and line drivers 205.

The DC/DC converters 210 provide an output rms current of approximately 1 percent of the 3-hour discharge capacity of the rechargeable batteries 50 from the DC power supply 120. In an exemplary embodiment, for batteries 50 having 3-hour discharge capacities of 100 amp-hours, the DC/DC converters 210 provide an output rms current of 1 amp±250 mA to the rechargeable batteries 50 from a DC power supply of about 9–16 volts provided by the auxiliary power supply 120. The DC/DC converters 210 further provide isolation between the rechargeable batteries 50 and the common power bus 130 of 500 VDC. The DC/DC converters 210 have an operating temperature range from about −40° C. to +80° C. The DC/DC converters 210 are controlled by means of a control line which has a logic level referenced to the common power bus 130.

The sensor nodes 200 and line drivers 205 provide isolation between the rechargeable batteries 50 and the common power bus 130 of 500 VDC. Communication between the sensor nodes 200 and line drivers 205 and the CPU 20 are accomplished by means of serial communication that utilizes the industry standard RS-485 communications protocol.

Each sensor node 200 can operate autonomously without being connected to a DC/DC converter 210 or a line driver 205. Each sensor node 200 includes temperature sensing, voltage sensing, and nonvolatile registers storing a number of counter values, as well as other operating parameters. Preferably, each sensor node 200 has a battery address so that when the battery modules 30 are placed together in a battery pack, each battery module 30 can be given a unique address so that it can be queried individually to access the warranty information resident in the nonvolatile registers related to battery voltage and operating temperature over the lifetime of its rechargeable battery 50.

Each sensor node 200 has a serial I/O link, by means of the line driver 205, which is optically isolated from the rechargeable battery 50. The sensor node 200 has one digital control line which controls the operation of the DC/DC converter 210, and two serial data signal lines. Each sensor node 200 also has the ability to integrate time spent above or below certain temperature corrected voltage levels so that the sensor node 200 can maintain a register which records how many minutes have been spent above the gassing voltage (gassing voltage refers to an upper temperature corrected voltage at which the plates of the rechargeable battery 50 begin to evolve gas). Preferably, the sensor node 200 allows the battery module 30 to store certain warranty information so that the contents of the sensor node registers may be interrogated through the serial I/O link to determine how the rechargeable battery 50 has been treated. For example, the sensor node 200 can determine how many times the rechargeable battery 50 was brought to too low a voltage, how many times the rechargeable battery 50 was brought to too high a voltage, how many times the rechargeable battery 50 was brought to too low an operating temperature, how many times the rechargeable battery 50 was brought to too high an operating temperature, and how much time it spent gassing.

The DC/DC converter 210 and line driver 205 permit the connection of a plurality of battery modules 30 in a battery pack by using a six wire bus (two wires for the serial interface 40, two wires for the signal port interface 41, and two wires for the power bus 130). This thereby enables the CPU 20 to interrogate each battery module 30 in the battery pack separately. It also allows the CPU 20 to pass energy to any one of the rechargeable batteries 50, by way of the DC/DC converters 210, to finish off a charge.

In one preferred embodiment, the modular construction of the battery modules 30 permits a number of combinations of sensor node 200, DC/DC converter 210, and line driver 205, thereby enabling a number of operational modes.

The battery module 30, utilizing both the DC/DC converter 210 and the line driver 205, permits the transmission of an average charging current of approximately 1 percent of the 3-hour discharge capacity of the rechargeable battery 50 from the power bus 130 to the rechargeable battery 50. This feature enables the battery management system 10 to finish off a charge that is controlled by the sensor node 200. The battery module 30 further provides about 500 volts of isolation between the common power bus 130, the V bus positive and battery positive and provides about 500 volt DC isolation on the driver receiver. The battery module 30 also enables the sensor node registers to be queried at the factory. And the battery module 30 also enables real time monitoring, meaning that the CPU 20 can determine in real time what the state of the rechargeable batteries 50 are.

If the DC/DC converter 210 is left out of the battery module 30, real time monitoring can still be performed. The real-time information can be obtained at any time from any sensor node 200 which is acting as a slave. The sensor node registers further can be queried at the factory, but with this configuration, the rechargeable batteries 50 cannot be equalized by passing energy back and forth through the DC/DC converters 210. Instead, the rechargeable batteries 50 would have to be charged in series using the bulk charger 80.

The battery modules 30 may also be operated with just the sensor node 200 in place in the battery module 30 for the purpose of recording warranty data.

An apparatus and method for management and control of battery power packs has been described which provides distributed control of the charging process of a plurality of rechargeable batteries thereby permitting precise and individualized charging of a plurality of rechargeable batteries. While a specific embodiment of the invention has been disclosed for use with lead-acid batteries, it will be recognized that principles and examples described herein are clearly applicable to other rechargeable battery systems.

While the invention is susceptible to various modifications and alternative forms, specific embodiments have been shown by way of example. However, it should be understood that the invention is not intended to be limited to the particular forms disclosed. Rather, the invention is intended to cover all modification, equivalents and alternatives falling within the spirit and scope of the invention as defined by the claims.

What is claimed is:

1. A battery management system, comprising:
   a plurality of battery modules, each said battery module comprising:
   a rechargeable battery;
   a sensor node operably coupled to said rechargeable battery, said sensor node comprising:
   a plurality of sensors operably coupled to said rechargeable battery adapted to generate sensor signals representative of conditions of said rechargeable battery; and
   a programmed microcontroller in communication with said plurality of sensors adapted to process said sensor signals to generate a plurality of battery status signals representative of a plurality of status conditions of said rechargeable battery; and
   a direct current charger operably coupled to said rechargeable battery and adapted to controllably provide a charging current to said rechargeable battery;
   a programmed central processing unit in communication with said plurality of programmed microcontrollers; and
   a bulk charger in communication with said programmed central processing unit and operably coupled to all of said rechargeable batteries and adapted to controllably provide a bulk charging current to all of said rechargeable batteries;
   wherein said rechargeable batteries are connected in series.

2. The battery management system of claim 1, wherein said plurality of sensors comprises:
   a temperature sensor operably coupled to said rechargeable battery and adapted to generate a battery temperature signal rechargeable be of a temperature of said rechargeable battery; and
   a voltage sensor operably coupled to said rechargeable battery and adapted to generate a battery voltage signal representative of a voltage of said rechargeable battery.

3. The battery management system of claim 2, wherein said temperature sensor comprises a thermistor.

4. The battery management system of claim 1, wherein each battery module further comprises:
   a line driver optically coupled to said sensor node and adapted to communicate with said programmed central processing unit.

5. The battery management system of claim 1, wherein said sensor node further comprises:
   a memory adapted to store said plurality of battery status conditions.

6. The battery management system of claim 1, further comprising:
   a bulk charger in communication with said programmed central processing unit and operably coupled to said rechargeable batteries and adapted to controllably provide a bulk charging current to said rechargeable batteries.

7. The battery management system of claim 6, wherein said bulk charging current is variable.

8. The battery management system of claim 7, further comprising a current sensor in communication with said programmed central processing unit and operably coupled to said bulk charger and adapted to generate a bulk charging current signal representative of a bulk charging current level.

9. The battery management system of claim 6, further comprising a control switch in communication with said programmed central processing unit and operably coupled to said bulk charger and adapted to controllably interrupt said bulk charging current.

10. The battery management system of claim 1, wherein said direct current charger comprises a DC/DC converter.

11. A battery management system, comprising:

a programmed central processing unit;

a plurality of battery modules in communication with said programmed central processing unit, each said battery module comprising:
  a rechargeable battery;
  a sensor node operably coupled to said rechargeable battery, said sensor node comprising:
    a temperature sensor operably coupled to said rechargeable battery and adapted to generate a battery temperature signal representative of a temperature of said rechargeable battery;
    a voltage sensor operably coupled to said rechargeable battery and adapted to generate a battery voltage signal representative of a voltage of said rechargeable battery;
    a memory adapted to store a plurality of battery status condition signals; and
    a programmed microcontroller in communication with said temperature sensor and said voltage sensor and operably coupled to said memory and adapted to process said rechargeable battery temperature signal and said rechargeable battery voltage signal to generate said plurality of battery status condition signals;
  a line driver optically coupled to said sensor node and adapted to transmit and receive signals between said programmed microcontroller and said programmed central processing unit; and
  a direct current charger operably coupled to said rechargeable battery and adapted to controllably provide a charging current to said rechargeable battery; and a bulk charger in communication with said programmed central processing unit and operably coupled to said rechargeable batteries and adapted to controllably provide a bulk charging current to all of said rechargeable batteries;

wherein said rechargeable batteries are connected in series.

12. A battery management system comprising:

a programmed central processing unit;

a plurality of battery modules in communication with said programmed central processing unit, each said battery module comprising:
  a rechargeable battery;
  a sensor node operably coupled to said rechargeable battery, said sensor node comprising:
    a temperature sensor operably coupled to said rechargeable battery and adapted to generate a rechargeable battery temperature signal representative of a temperature of said rechargeable battery;
    a voltage sensor operably coupled to said rechargeable battery and adapted to generate a rechargeable battery voltage signal representative of a voltage of said rechargeable battery;
    a memory adapted to store a plurality of battery status conditions;
    a programmed microcontroller in communication with said temperature sensor, said voltage sensor, and said memory and adapted to process said rechargeable battery temperature signal and said rechargeable battery voltage signal to generate said plurality of battery status conditions;
  a line driver optically coupled to said sensor node and adapted to transmit and receive signals between said programmed microcontroller and said programmed central processing unit; and
  a DC/DC converter operably coupled to said rechargeable battery and adapted to controllably provide a charge current to said rechargeable battery;

a bulk battery charger in communication with said programmed central processing unit and operably coupled to said rechargeable batteries and adapted to controllably provide a bulk charging current to said rechargeable batteries;

a current sensor in communication with said programmed central processing unit and operably coupled to said bulk battery charger and adapted to generate a bulk charging current signal representative of a bulk charging current level;

an auxiliary power supply operably coupled to each of said DC/DC converters and adapted to provide a DC power supply to each of said DC/DC converters; and a control switch operably coupled to said bulk battery charger and in communication with said programmed central processing unit and adapted to controllably interrupt said bulk charging current.

13. A battery management system, comprising:

a programmed central processing unit;

a plurality of battery modules in communication with said programmed central processing unit, each said battery module comprising:
  a rechargeable battery;
  a sensor node operably coupled to said rechargeable battery, said sensor node comprising:
    a plurality of battery condition sensors operably coupled to said rechargeable battery and adapted to generate a plurality of battery condition signals representative of a plurality of operating conditions of said rechargeable battery; and
    a programmed microcontroller in communication with said plurality of battery condition sensors and adapted to process said plurality of battery condition signals to generate a plurality of battery status signals representative of a plurality of status conditions of said rechargeable battery; and
  a direct current charger operably coupled to said rechargeable battery and adapted to controllably provide a charging current to said rechargeable battery;

a bulk battery charger in communication with said programmed central processing unit and operably coupled to said rechargeable batteries and adapted to controllably provide a bulk charging current to all of said rechargeable batteries;

a current sensor in communication with said programmed central processing unit and operably coupled to said bulk battery charger and adapted to generate a bulk charging current signal representative of a bulk charging current level;

an auxiliary power supply operably coupled to each of said direct current chargers and adapted to provide a DC power supply to each of said direct current chargers; and a control switch operably coupled to said bulk battery charger and in communication with said programmed central processing unit and adapted to controllably interrupt said bulk charging current;

wherein said rechargeable batteries are connected in series.

14. A battery module, comprising:

a rechargeable battery;

a sensor node operably coupled to said rechargeable battery, said sensor node comprising:

a plurality of battery condition sensors operably coupled to said rechargeable battery and adapted to generate a plurality of battery condition signals representative of a plurality of operating conditions of said rechargeable battery; and a programmed microcontroller in communication with said plurality of battery condition sensors and adapted to process said plurality of battery condition signals to generate a plurality of battery status signals representative of a plurality of status conditions of said rechargeable battery, said plurality of battery status signals including:

a high temperature flag signal indicating a temperature of said rechargeable battery is greater than a predetermined maximum temperature;

a low temperature flag signal indicating said temperature of said rechargeable battery is less than a predetermined minimum temperature;

a high voltage flag signal indicating a voltage of said rechargeable battery is greater than a predetermined clamping voltage; and a low voltage flag signal indicating said voltage of said rechargeable battery is less than a predetermined minimum voltage; and a direct current charger operably coupled to said rechargeable battery for controllably providing a charging current to said rechargeable battery.

15. The battery module of claim 14, wherein said plurality of battery condition sensors comprises:

a temperature sensor operably coupled to said rechargeable battery and adapted to generate a battery temperature signal representative of a temperature of said rechargeable battery; and a voltage sensor operably coupled to said rechargeable battery and adapted to generate a battery voltage signal representative of a voltage of said rechargeable battery.

16. The battery module of claim 15, wherein said temperature sensor comprises a thermistor.

17. The battery module of claim 14, further comprising:

a line driver optically coupled to said programmed microcontroller and adapted to transmit and receive data signals.

18. The battery module of claim 17, wherein said data signals comprise serial data signals.

19. The battery module of claim 14, wherein said direct current charger comprises a DC/DC converter.

20. The battery module of claim 14, wherein said sensor node further comprises:

a memory adapted to store said plurality of battery status signals.

21. A battery module, comprising:

a rechargeable battery;

a sensor node operably coupled to said rechargeable battery, said sensor node comprising:

a temperature sensor operably coupled to said rechargeable battery and adapted to generate a battery temperature signal representative of a temperature of said rechargeable battery;

a voltage sensor operably coupled to said rechargeable battery and adapted to generate a rechargeable battery voltage signal representative of a voltage of said rechargeable battery;

a memory adapted to store a plurality of battery status conditions;

a programmed microcontroller in communication with said temperature sensor, said voltage sensor, and said memory and adapted to process said battery temperature signal and said battery voltage signal to generate said plurality of battery status conditions, said plurality of battery status conditions including:

a high temperature condition indicating a temperature of said rechargeable battery is greater than a predetermined maximum temperature;

a low temperature condition indicating said temperature of said rechargeable battery is less than a predetermined minimum temperature;

a high voltage condition indicating a voltage of said rechargeable battery is greater than a predetermined clamping voltage; and a low voltage condition indicating said voltage of said rechargeable battery is less than a predetermined minimum voltage;

a line driver optically coupled to said programmed microcontroller and adapted to permit communication between said programmed microcontroller and an external programmed central processing unit; and a DC/DC converter operably coupled to said rechargeable battery and adapted to controllably provide a charging current to said rechargeable battery.

22. A method for charging and maintaining a plurality of rechargeable batteries connected in series in a full and ready condition comprising:

measuring a temperature of each of said rechargeable batteries;

measuring a voltage of each of said rechargeable batteries;

providing a variable bulk charging current to all of said rechargeable batteries; and providing a separate charging current to each of said rechargeable batteries.

23. The method of claim 22, wherein providing a variable bulk charging current to all of said rechargeable batteries comprises:

reducing said variable bulk charging current when said measured voltage for any of said rechargeable batteries is greater than a predetermined battery clamping voltage level.

24. The method of claim 23, wherein providing a variable bulk charging current to all of said rechargeable batteries further comprises:

interrupting said variable bulk charging current when said variable bulk charging current is approximately equal to a predetermined minimum bulk charging current.

25. The method of claim 23, wherein reducing said variable bulk charging current comprises:

reducing said variable bulk charging current by approximately one half when said measured voltage for any of said rechargeable batteries is greater than a predetermined battery clamping voltage level.

26. The method of claim 22, wherein providing a variable bulk charging current to all of said rechargeable batteries comprises:
   reducing said variable bulk charging current when said measured voltage for any of said rechargeable batteries is greater than or equal to a predetermined battery clamping voltage level; and
   interrupting said variable bulk charging current when said variable bulk charging current is approximately equal to a predetermined minimum bulk charging current.

27. The method of claim 22, wherein providing a separate charging current to each rechargeable battery comprises:
   providing a separate charging current to each rechargeable battery whose measured battery voltage is less than or equal to a predetermined battery clamping voltage level.

28. The method of claim 22, wherein providing a separate charging current to each rechargeable battery comprises:
   providing a separate charging current to each rechargeable battery that is not full.

29. The method of claim 22, wherein providing a separate charging current to each rechargeable battery comprises:
   providing a separate charging current to each rechargeable battery whose measured battery voltage is less than or equal to a predetermined battery clamping voltage level; and
   providing a separate charging current to each rechargeable battery that is not full.

30. The method of claim 22, further comprising:
   providing a separate charging current to each full rechargeable battery whose measured temperature is less than a predetermined minimum temperature at a full and ready condition.

31. The method of claim 22, further comprising:
   providing a separate charging current to each full rechargeable battery whose measured battery voltage is less than a predetermined lower level at a full and ready condition.

32. The method of claim 22, further comprising:
   providing a separate charging current to each full rechargeable battery whose measured temperature is less than a predetermined minimum temperature at a full and ready condition; and
   providing a separate charging current to each full rechargeable battery whose measured battery voltage is less than a predetermined lower level at a full and ready condition.

33. A method for charging and maintaining a plurality of rechargeable batteries connected in series in a full and ready condition comprising:
   measuring a temperature of each of said rechargeable batteries;
   measuring a voltage of each of said rechargeable batteries;
   providing a variable bulk charging current to all of said rechargeable batteries;
   reducing said variable bulk charging current when said measured voltage for any of said rechargeable batteries is greater than or equal to a predetermined battery clamping voltage level;
   providing a separate charging current to each rechargeable battery whose measured battery voltage is less than said battery clamping voltage level; and
   interrupting said bulk charging current when said bulk charging current is approximately equal to a predetermined lower bulk charging current level.

34. A method for charging and maintaining a plurality of rechargeable batteries connected in series in a full and ready condition comprising:
   measuring a temperature of each of said rechargeable batteries;
   measuring a voltage of each of said rechargeable batteries;
   providing a variable bulk charging current to all of said rechargeable batteries;
   reducing said variable bulk charging current when said measured voltage for any of said rechargeable batteries is greater than or equal to a predetermined battery clamping voltage level;
   providing a separate charging current to each rechargeable battery whose measured battery voltage is less than said battery clamping voltage level;
   interrupting said bulk charging current when said bulk charging current is approximately equal to a predetermined lower bulk charging current level; and
   providing a separate charging current to each rechargeable battery that is not full.

35. A method for charging and maintaining a plurality of rechargeable batteries connected in series in a full and ready condition comprising:
   measuring a temperature of each of said rechargeable batteries;
   measuring a voltage of each of said rechargeable batteries;
   providing a variable bulk charging current to all of said rechargeable batteries;
   reducing said variable bulk charging current when said measured voltage for any of said rechargeable batteries is greater than or equal to a predetermined battery clamping voltage level;
   providing a separate charging current to each rechargeable battery whose measured battery voltage is less than said battery clamping voltage level;
   interrupting said bulk charging current when said bulk charging current is approximately equal to a predetermined minimum bulk charging current;
   providing a separate charging current to each rechargeable battery that is not full;
   providing a separate charging current to each full rechargeable battery whose measured temperature is less than a predetermined minimum temperature at a full and ready condition; and
   providing a separate charging current to each full rechargeable battery whose measured battery voltage is less than a predetermined lower level at a full and ready condition.

36. A method for charging and maintaining a plurality of rechargeable batteries connected in series in a full and ready condition comprising:
   charging each of said rechargeable batteries to said full and ready condition by controllably providing a bulk charging current to all of said rechargeable batteries and a separate charging current to each of said rechargeable batteries; and
   maintaining said rechargeable batteries at said full and ready condition by controllably providing said separate charging current to each of said rechargeable batteries.

37. The method of claim 36, wherein charging comprises:
  measuring a temperature of each of said rechargeable batteries;
  measuring a voltage of each of said rechargeable batteries;
  providing a variable bulk charging current to all of said rechargeable batteries; and
  providing a separate charging current to each rechargeable battery.

38. The method of claim 37, wherein providing a variable bulk charging current to all of said rechargeable batteries comprises:
  reducing said variable bulk charging current when said measured voltage for any of said rechargeable batteries is greater than a predetermined battery clamping voltage level.

39. The method of claim 38, wherein providing a variable bulk charging current to all of said rechargeable batteries further comprises:
  interrupting said bulk charging current when said bulk charging current is approximately equal to a predetermined minimum bulk charging current.

40. The method of claim 38, wherein reducing said variable bulk charging current comprises:
  reducing said variable bulk charging current by approximately one half when said measured voltage for any of said rechargeable batteries is greater than a predetermined battery clamping voltage level.

41. The method of claim 37, wherein providing a variable bulk charging current to all of said rechargeable batteries comprises:
  reducing said variable bulk charging current when said measured voltage for any of said rechargeable batteries is greater than or equal to a predetermined battery clamping voltage level; and
  interrupting said bulk charging current when said bulk charging current is approximately equal to a predetermined minimum bulk charging current.

42. The method of claim 37, wherein providing a separate charging current to each rechargeable battery comprises:
  providing a separate charging current to each rechargeable battery whose measured battery voltage is less than or equal to a predetermined battery clamping voltage level.

43. The method of claim 37, wherein providing a separate charging current to each rechargeable battery comprises the step of:
  providing a separate charging current to each rechargeable battery that is not full.

44. The method of claim 37, wherein providing a separate charging current to each rechargeable battery comprises:
  providing a separate charging current to each rechargeable battery whose measured battery voltage is less than or equal to a predetermined battery clamping voltage level; and
  providing a separate charging current to each rechargeable battery that is not full.

45. The method of claim 36, wherein charging comprises:
  measuring a temperature of each of said rechargeable batteries;
  measuring a voltage of each of said rechargeable batteries;
  providing a variable bulk charging current to all of said rechargeable batteries;
  reducing said variable bulk charging current when said measured voltage for any of said rechargeable batteries is greater than or equal to a predetermined battery clamping voltage level;
  providing a separate charging current to each rechargeable battery whose measured battery voltage is less than said battery clamping voltage level;
  interrupting said bulk charging current when said bulk charging current is approximately equal to a predetermined minimum bulk charging current; and
  providing a separate charging current to each rechargeable battery that is not full.

46. The method of claim 36, wherein maintaining comprises:
  measuring a temperature of each of said rechargeable batteries; and
  providing a separate charging current to each full rechargeable battery whose measured temperature is less than a predetermined minimum temperature at a full and ready condition.

47. The method of claim 36, wherein maintaining comprises:
  measuring a voltage of each of said rechargeable batteries; and
  providing a separate charging current to each full rechargeable battery whose measured battery voltage is less than a predetermined lower level at a full and ready condition.

48. The method of claim 36, wherein maintaining comprises:
  measuring a temperature of each of said rechargeable batteries;
  measuring a voltage of each of said rechargeable batteries;
  providing a separate charging current to each full rechargeable battery whose measured temperature is less than a predetermined minimum temperature at a full and ready condition; and
  providing a separate charging current to each full rechargeable battery whose measured battery voltage is less than a predetermined lower level at a full and ready condition.

* * * * *

UNITED STATES PATENT AND TRADEMARK OFFICE
CERTIFICATE OF CORRECTION

PATENT NO.    :    5,701,068

DATED         :    December 23, 1997

INVENTOR(S)   :    Baer et al.

It is certified that error appears in the above-identified patent and that said Letters Patent is hereby corrected as shown below:

Column 30, line 48 change "rechargeable be" to --representative--.

Signed and Sealed this

Twenty-first Day of April, 1998

Attest:

BRUCE LEHMAN

*Attesting Officer*      *Commissioner of Patents and Trademarks*